(12) United States Patent
Draper et al.

(10) Patent No.: US 7,152,062 B1
(45) Date of Patent: Dec. 19, 2006

(54) TECHNIQUE FOR ENCAPSULATING A QUERY DEFINITION

(75) Inventors: Denise L. Draper, Seattle, WA (US); Joseph Heitzeberg, Bellevue, WA (US)

(73) Assignee: Actuate Corporation, South San Francisco, CA (US)

(*) Notice: Subject to any disclaimer, the term of this patent is extended or adjusted under 35 U.S.C. 154(b) by 377 days.

(21) Appl. No.: 09/718,228

(22) Filed: Nov. 21, 2000

(51) Int. Cl.
*G06F 17/30* (2006.01)

(52) U.S. Cl. ............ 707/4; 707/101; 707/103 Y

(58) Field of Classification Search ............ 707/3, 707/4, 100, 103 R, 101, 103 X, 103 Y, 103 Z, 707/10; 715/513
See application file for complete search history.

(56) References Cited

U.S. PATENT DOCUMENTS

| | | | |
|---|---|---|---|
| 4,014,004 A | 3/1977 | Fuller | 340/10.41 |
| 5,572,583 A | 11/1996 | Wheeler, Jr. et al. | 379/221.09 |
| 5,826,258 A | 10/1998 | Gupta et al. | 707/4 |
| 5,852,825 A | 12/1998 | Winslow | 707/6 |
| 5,913,214 A | 6/1999 | Madnick et al. | 707/10 |
| 5,956,720 A | 9/1999 | Fernandez et al. | 707/10 |
| 5,970,490 A | 10/1999 | Morgenstern | 707/10 |
| 5,983,232 A | 11/1999 | Zhang | 707/102 |
| 6,012,098 A | 1/2000 | Bayeh et al. | |
| 6,016,497 A | 1/2000 | Suver | 707/103 R |
| 6,052,693 A | 4/2000 | Smith et al. | 707/104.1 |
| 6,076,087 A | 6/2000 | Suciu | 707/3 |
| 6,094,649 A | 7/2000 | Bowen et al. | 707/3 |
| 6,154,738 A | 11/2000 | Call | 707/4 |
| 6,263,332 B1 | 7/2001 | Nasr et al. | 707/5 |
| 6,269,368 B1 | 7/2001 | Diamond | 707/6 |
| 6,279,006 B1 | 8/2001 | Shigemi et al. | 707/101 |
| 6,308,179 B1 | 10/2001 | Petersen et al. | 707/102 |
| 6,339,776 B1 | 1/2002 | Dayani-Fard et al. | 707/102 |
| 6,343,287 B1* | 1/2002 | Kumar et al. | 707/4 |
| 6,356,906 B1 | 3/2002 | Lippert et al. | 707/10 |
| 6,356,920 B1 | 3/2002 | Vandersluis | 715/501.1 |
| 6,389,429 B1 | 5/2002 | Kane et al. | 707/200 |
| 6,418,448 B1* | 7/2002 | Sarkar | 707/104.1 |
| 6,449,620 B1 | 9/2002 | Draper et al. | 707/102 |
| 6,487,566 B1* | 11/2002 | Sundaresan | 715/513 |
| 6,507,856 B1* | 1/2003 | Chen et al. | 715/513 |
| 6,507,857 B1* | 1/2003 | Yalcinalp | 715/513 |
| 6,516,321 B1 | 2/2003 | De La Huerga | 707/102 |

(Continued)

FOREIGN PATENT DOCUMENTS

WO    WO 01/17286    3/2001

OTHER PUBLICATIONS

Konopnicki et al., A Comprehensive Framework for Querying & Integrating WWW Data and Services, IEEE Proceedings Cooperative Information Systems, Sep. 1999, pp. 172-183.*

(Continued)

*Primary Examiner*—Greta Robinson
(74) *Attorney, Agent, or Firm*—Beyer Weaver & Thomas LLP

(57) ABSTRACT

A method and system for querying data sources. The query system provides a query definition for defining queries in a uniform manner. The query definition includes a query specification, a data source identifier, and optionally, one or more results transforms. The query definition may be stored as a data structure on computer-readable media, such as a CD-ROM. The query specification includes query text and parameters. The query text specifies the query expression that is to be applied to the identified data source to generate the results. The parameters specify portions of the query text that can be changed by a user before a query is executed.

68 Claims, 14 Drawing Sheets

U.S. PATENT DOCUMENTS

| | | | |
|---|---|---|---|
| 6,535,896 B1 * | 3/2003 | Britton et al. | 715/523 |
| 6,539,378 B1 | 3/2003 | Gupta et al. | 707/5 |
| 6,581,062 B1 * | 6/2003 | Draper et al. | 707/100 |
| 6,601,071 B1 | 7/2003 | Bowker et al. | 707/102 |
| 6,604,100 B1 * | 8/2003 | Fernandez et al. | 707/3 |
| 6,697,818 B1 | 2/2004 | Li et al. | 707/103 R |
| 6,714,939 B1 | 3/2004 | Saldanha et al. | 707/102 |
| 6,754,648 B1 | 6/2004 | Fittges et al. | 380/201 |
| 6,799,184 B1 * | 9/2004 | Bhatt et al. | 707/102 |
| 6,826,553 B1 | 11/2004 | DaCosta et al. | 707/1 |
| 2002/0120630 A1 | 8/2002 | Christianson et al. | 707/103 R |
| 2002/0133497 A1 | 9/2002 | Draper et al. | 707/100 |

OTHER PUBLICATIONS

Accessing Data Using Visual Basic http://msdn.microsoft.com/library/en-us/vbcon98/html/vbconaccessingdata.asp?frame=true [Accessed Nov. 11, 2001], pp. 1-3.

Forms and Data-Aware Controls http://msdn.microsoft.com/library/en-us/vbcon98/.../vbcondataawarecontrols.asp?frame=tru [Accessed Nov. 11, 2001], pp. 1-6.

Oracle 8 Concepts, Release 8.0 Procedures and Packages http://www.-wnt.gsi.de/oragsidoc/doc_804/database.804/a58227/ch14.html [Accessed Nov. 11, 2001], Chapters 17-19.

Reilly, Douglas, "Using Stored Procedures in Active Server Pages" http://www.ddj.com/documents/s=875/ddj0065e/ [Accessed Nov. 11, 2001], pp. 1-8.

Nimble Technology, "The Nimble Integration Suite™" White Paper, Sep. 11, 2000, pp. 1-10.

Stored Procedures Overview http://www.va/pubnix.com/man/xdb/sqlref/Overview_413.html [Accessed Nov. 11, 2001], pp. 1-34.

W3C XML-QL: A Query Language for XML Submission to the World Wide Web Consortium, Aug. 19, 1998 http://www.w3.org/TR/1998/NOTE-xml-ql-19980819/ [Accessed Nov. 11, 2001].

W3C Architecture Domain, XML Schema http://www.w3.org/XML/Schema.html [Accessed Nov. 11, 2001], pp. 1-140.

W3C Document Formats Domain, The Extensible Stylesheet Language (XSL) http://www.w3.org/Style/XSL [Accessed Nov. 11, 2001], pp. 1-100.

Deutsch, Alin et al., "A Query Language for XML," Computer Networks 31, May 17, 1999 (pp. 1155-1169).

Bonifati, Angela et al., "Comparative Analysis of Five XML Query Languages," SIGMOD Record, vol. 29, No. 1, Mar. 2000 (pp. 68-79).

W3C XSL Transformation (XSLT) Version 1.0, Nov. 16, 1999 (11 pages) http://www.w3.org/Style/XSL/translations.html.

Colby, Latha S., "A Recursive Algebra and Query Optimization for Nested Relations," Department of Computer Science, Indiana University, Bloomington, IN, pp. 273-283, SIGMOD '95.

Fegaras, Leonidas and Maier, David, "Towards an Effective Calculus for Object Query Languages," Department of Computer Science and Engineering, Oregon Graduate Institute of Science & Technology, Portland, OR, pp. 47-58, SIGMOD '95.

Breazu-Tannen, Val et al., "Naturally Embedded Query Languages," Database Theory—ICDT '92, 4th International Conference, Berlin, Germany, Oct. 14-16, 1992 Proceedings.

Abiteboul, Serge, et al., "Foundations of Databases," Chapter 20, pp. 508-541, Addison-Wesley Publishing Company, Inc., 1995.

Goldman, Roy and Widom, Jennifer, "DataGuides: Enabling Query Formulation and Optimization in Semistructured Databases," Proceedings of the 23rd VLDB Conference, Athens, Greece, 1997 (10 pp).

Florescu, Daniela, et al, "A Performance Evaluation of Alternative Mapping Schemes for Storing XML Data in a Relational Database," an Experience Paper, pp. 1-22.

Shanmugasundaram, Jayavel, et al, "Relational Databases for Querying XML Documents: Limitations and Opportunities," Proc. Of the 25th VLDB Conf., Edinburgh, Scotland, 1999, 13 pp.

Kasukawa et al., A New Method for Maintaining Semi-Structured Data Described in XML, Communications, Computers and Signal Processing, 1999 IEEE Pacific Rim Conference on Aug. 22-24, 1999, pp. 258-261.

Lowry, XML Data Mediation and Collaboration: A Proposed Comprehensive Architecture and Query Requirements for Using XML to Mediate Heterogeneous Data Sources and Targets, 2001. Proceedings of the 34th Hawaii Inter. Conf. On System Sciences, Jan. 2, 2001, pp. 1-9.

International Search Report for International Application No. PCT/US01/06755, Nimble Technology, Inc., Nov. 28, 2003, pp. 1-3.

* cited by examiner

| Background | | Story | | |
|---|---|---|---|---|
| Company | Event | Title, Date | City, State | Text, URL |
| Goldman Sachs | Equity Investment | Title 1, 01/01/99 | Seattle, WA | First Story, http//www.one.com |
| | | Title 2, 02/02/99 | Portland, OR | Second Story, http//www.two.com |
| | | Title 3, 03/03/99 | Las Vegas, NV | Third Story, http//www.three.com |

600 news table
601 background column
602 table
605 story column
606 table

*Fig. 6*

TECHNIQUE FOR ENCAPSULATING A QUERY DEFINITION

TECHNICAL FIELD

The described technology relates generally to query definitions.

BACKGROUND

It is becoming increasingly important for companies to electronically exchange information internally among their business units and externally with their customers, suppliers, and partners. This exchange of information may be driven by a desire to analyze success across global divisions, compare existing business practices among subsidiaries, extract and integrate information from customer or third-party databases, and so on. A company that can exchange information in a timely and efficient manner has a distinct competitive advantage for several reasons. For example, suppliers may give discounts to customers with whom they can exchange information electronically, or customers may only select a supplier with whom they can exchange information electronically.

The exchange of such information presents significant challenges because companies employ a wide variety of computer systems to handle their data processing needs. A single company may use many different hardware platforms, operating systems, and file formats that are incompatible and the incompatibility increases when different companies are considered. Moreover, a company's data may be stored at geographically diverse locations and may be even stored on third-party computer systems, such as those of suppliers. Because of the differences, the electronic exchange of information may be a complex task.

Traditional techniques for electronic exchange of information result in the building of newer and larger databases of information, such as data warehouses or custom applications. These traditional techniques, however, can be very costly and time-consuming. Moreover, the new databases may be inflexible and may not easily accommodate new sources or formats of data.

Another disadvantage of these traditional techniques is that users need to become familiar with the various query languages in order to retrieve the information from the databases. This disadvantage is magnified because each company may use a different database system with different query language requirements. Users would, of course, find it desirable to learn only one query language rather than having to learn many, and would find it even more desirable to submit queries without even having to learn a query language. Some databases allow users to execute queries that have been predefined. Thus, the users do not need to learn the query language. A disadvantage of such predefined queries, however, is that they may not allow for all the flexibility needed by a user.

The technology of the detailed description section is described with reference to the Extensible Markup Language ("XML"), to XML style sheets and to XML-QL. XML is a set of rules for defining semantic tags of documents. These tags identify different parts of the documents. For example, a document describing an order to be placed by a customer may include an "order" tag, a "purchase order number" tag, "stock keeping unit" ("SKU") tags and so on. Table 1 illustrates a sample XML document.

TABLE 1

| | |
|---|---|
| 1. | <order> |
| 2. | <po number>12321</po number> |
| 3. | <item> |
| 4. | <sku>55551</sku> |
| 5. | <quantity>2</quantity> |
| 6. | </item> |
| 7. | <item> |
| 8. | <sku>55552</sku> |
| 9. | <quantity>1</quantity> |
| 10. | </item> |
| 11. | </order> |

The "order" tags (i.e., <order> and </order>) of lines 1 and 11 delimit and identify the information of the order, the "po number" tags of line 2 delimit and identify a purchase order number (i.e., "12321"), the "item" tags of lines 3 and 6 and lines 7 and 10 delimit and identify the information of each item being ordered and so on.

XML also defines document type definitions ("DTD") for specifying the syntax of XML documents. DTD's specify a set of rules for the structure of the document by specifying the elements, attributes and entities contained in the document and their relationships to one another. For example, a DTD may specify that an order element may have one purchase order number child element and multiple item child elements. When an XML document is processed, its structure can be validated to conform with the DTD. The DTD's can be stored either in the XML document itself or in a file that is external to the XML document. In the latter case, a reference to the external file is stored in the XML document.

The Extensible Style Sheet Language ("XSL") is a style sheet language designed specifically for use with XML documents. XSL specifies a formatting language and a transformation language. XSL documents are themselves well-formed XML documents. The XSL formatting language describes how content should be rendered when presented to a user. XSL documents contain a series of rules that are to be applied to particular patterns of XML elements. When an XSL document is applied to an XML document, the patterns of the XSL document are identified in the XML document and the formatting information associated with a pattern in the XSL document is applied to the matching pattern in the XML document. Table 2 contains an example of an XSL document that can be applied to the XML document of Table 1.

TABLE 2

```
<xsl:stylesheet version="1.0" mlns:xsl="http://www.w3.org/1999/XSL/Transform">
    <xsl:template match="/*">
        <table border="1">
            <xsl:apply-templates/>
        </table>
    </xsl:template>
```

TABLE 2-continued

```
<xsl:template match="/*/po_number">
    <tr>
        <td colspan="3" class="lensSubhead">
            <xsl:value-of select="local-name( )"/>
            : <xsl:apply-templates/>
        </td>
    </tr>
</xsl:template>
<xsl:template match="/*/item">
<tr>
        <td class="lensSubhead">
            <xsl:value-of select="local-name( )"/>
        </td>
        <xsl:apply-templates/>
</tr>
</xsl:template>
<xsl:template match="/*/*/*">
    <td class="lensBody">
        <xsl:value-of select="local-name( )"/>
        : <xsl:apply-templates/>
    </td>
</xsl:template>
</xsl:stylesheet>
```

The transformation language of XSL provides elements that define rules for how one XML document is transformed into another XML document. XSL documents include templates or patterns that are to be matched in an XML document. When a template is matched, the XSL document specifies the output for the new document. That output may be a combination of information from the XML document or information specified in the XSL document. XML, DTD's and XSL are described in the book entitled "XML Bible," written by Elliotte Rusty Harord, and published by IDG Books Worldwide, Inc. in 1999 and which is hereby incorporated by reference.

A query language is being defined to support XML. The query language is known as XML-QL. The document entitled "XML-QL: A Query Language for XML," by Deutsch et al, submitted to the World Wide Web Consortium Aug. 19, 1998, is published by the World Wide Web Consortium ("W3C") and is hereby incorporated by reference. The XML-QL is being defined to specifically support query data stored in the XML format.

BRIEF DESCRIPTION OF THE DRAWINGS

FIG. 6 illustrates Table 7.

DETAILED DESCRIPTION

Figure 1:
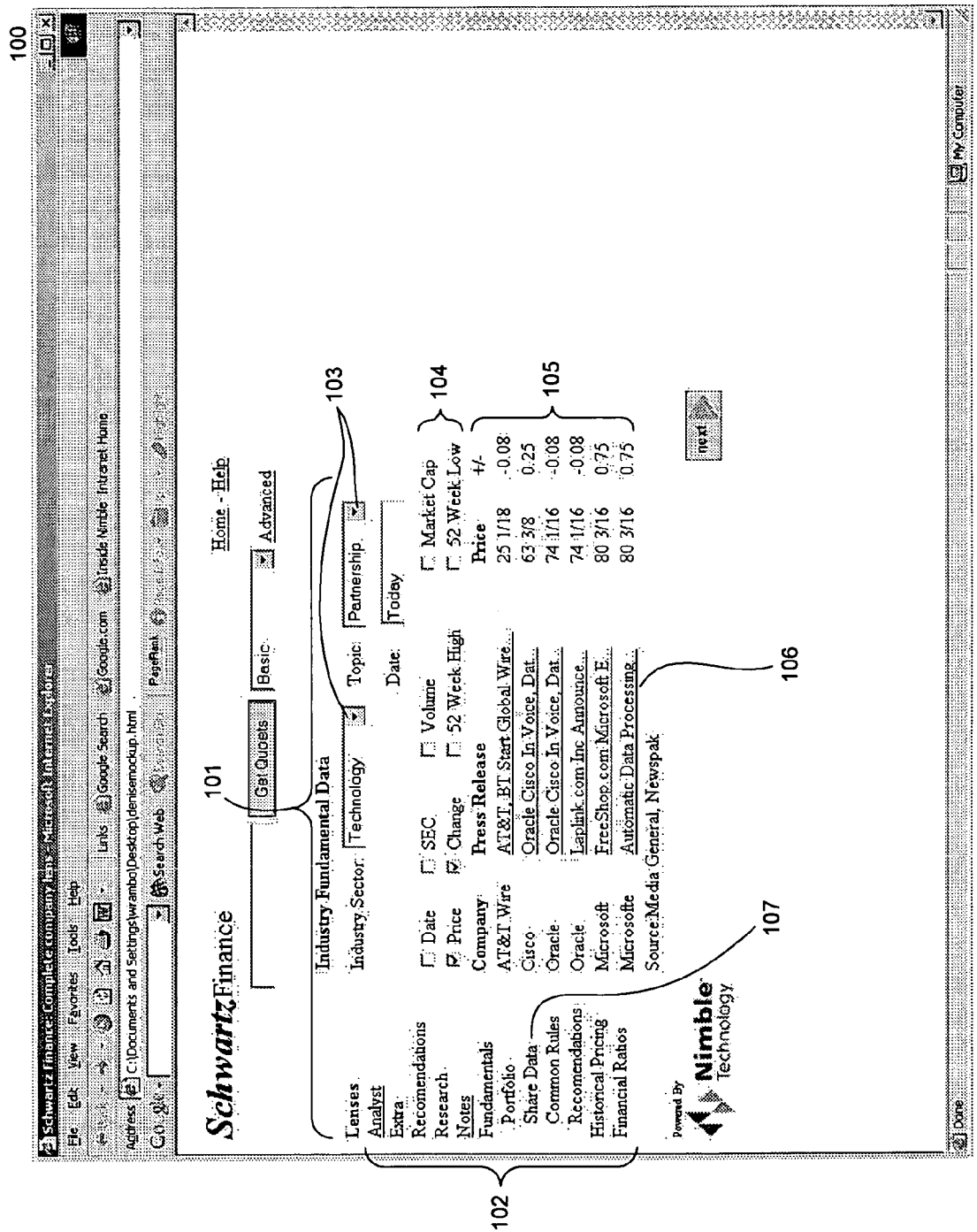
FIG. 1 illustrates an example user interface provided by an application program that supports lenses.

A method and system for querying data sources is provided. The query system provides a query definition for defining queries in a uniform manner. The query definition includes a query specification, a data source identifier, and optionally, one or more results transforms. The query definition may be stored as a data structure on a computer-readable medium, such as a CD-ROM. The query specification includes query text and parameters. The query text specifies the query expression that is to be applied to the identified data source to generate the results. The parameters specify portions of the query text that can be changed by a user before a query is executed. If a results transform is included in the query definition, then it is optionally applied to the results of the query to transform the results into a new format. In one embodiment, the new format is a canonical format that can be processed by different application programs. To execute the query, the query text with the parameter values are provided to the identified data source. When the identified data source returns the query results, the results transform is applied to the query results to transform the results into the canonical format. The results transform may also specify various display attributes (e.g., color) for the transformed results. An application program can then display the transformed results. A query definition can be used by different application programs. For example, a query definition can be used by a spreadsheet program to retrieve data from the data source for analysis, and a copy of that query definition can be used by a word processing program to retrieve data to be listed in a report.

In one embodiment, the query definition is represented as an XML document, which is referred to as a "lens," and the query system is referred to as the "lens system." The lens system may provide an application programming interface ("API") through which application programs can load lenses, execute lenses and receive the results of the execution. Once a lens is loaded, the application program can retrieve the parameters associated with the query specification and prompt a user to input parameter values. The application program then creates an instance of the query text with the parameters set to the parameter values and requests the lens system to execute the query. Alternatively, the retrieving of the parameters and the prompting for parameter values can program. The application program can then retrieve the results of the query, which may be in the canonical format, and display the results to the user as appropriate. Because a lens encapsulates the information needed to define a query, copies of the lens can be distributed to various computer systems for execution by the same application program or by different application programs. In addition, the lens system allows the default values of the lens parameters that are actually stored in the lens to be modified dynamically. In this way, one user can change the current parameter values stored in a lens and send a copy of the lens to another user for execution.

FIG. 1 illustrates an example user interface provided by an application program that supports lenses. Web page 100 is designed to display financial information as requested by the user. The lens area 101 includes a lens selection area 102, a parameter area 103, the display options area 104 and a results area 105. The user may select one of the available lenses from the lens selection area. The lenses are displayed in a hierarchy. In this example, the user has elected the "Fundamentals-Share Data" lens 107. Once the user has selected the lens, the user can select a value for each parameter. In this example, the user has selected the value of "Technology" for the industry sector parameter and the value of "Partnership" for the topic parameter. The user can also select the fields to be displayed from the results using the check boxes in the display options area. In this example, the user selected to display stock price and change information. Once the query is executed, the results are displayed in the results area. In this example, the results include hyperlinks 106 along with price and change information as indicated by the display options area. In one embodiment, the creator of the lens has control over the selection of parameters, what display options to allow and the overall layout of the display of the results. Alternatively, an application program may have this control.

Figure 2:
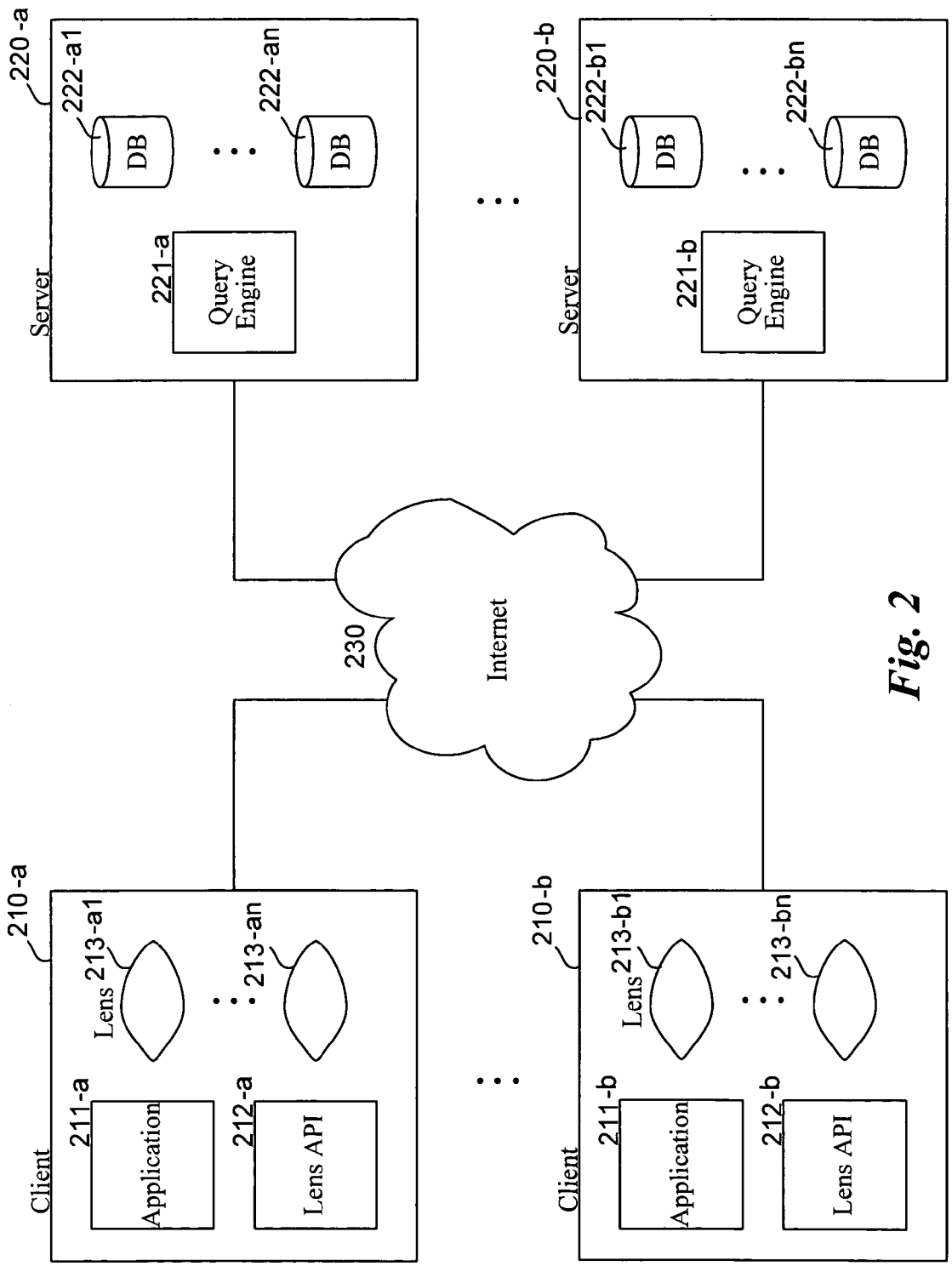
FIG. 2 is a block diagram illustrating components of the lens system. The client computers 100 are connected to the server computers 120 via the Internet 130.

FIG. 2 is a block diagram illustrating components of the lens system. The client computers 200 are connected to the server computers 220 via the Internet 230. The client computers include various application programs 211, lens API 212, and various lenses 213. The application programs invoke the functions of the lens API to access the lenses. Since the format of the lenses is encapsulated by the lens API, the application programs need not be developed with knowledge of the lens format. The lenses may be stored in a predefined file system directory so that the application programs can identify the available lenses. Alternatively, the lens API could provide a function that lists the available lenses. The application programs invoke the various functions of the lens API to load a lens, to set the parameter values of the lens and to execute the lens. When the lens is executed, the lens API sends the query text with the parameter values to the identified data source which may be located on a server computer. The server may include a query engine 221 and various databases 222. When the query engine receives a request to execute a query, it coordinates the execution of the query using the various databases as data sources. When the query results are generated, the query engine sends the results to the client computer. When the results are received by the client computer, the function of the API that initiated the execution of the query may then use the results transform of the lens to transform the results to a canonical format before returning the results to the application program. The application program can then display the results. The computers of the client computer and the server computer may include a central processing unit, memory, input devices (e.g., keyboard and pointing devices), output devices (e.g., display devices) and storage devices (e.g., disk drives). The memory and storage devices are computer-readable media that may contain instructions for implementing the lens system. In addition, the data structures and message structures may be stored or transmitted via a data transmission medium, such as a signal on a communications link. Various communications channels other than the Internet may be used, such as a local area network, a wide area network or a point-to-point dial-up connection.

Figure 3:
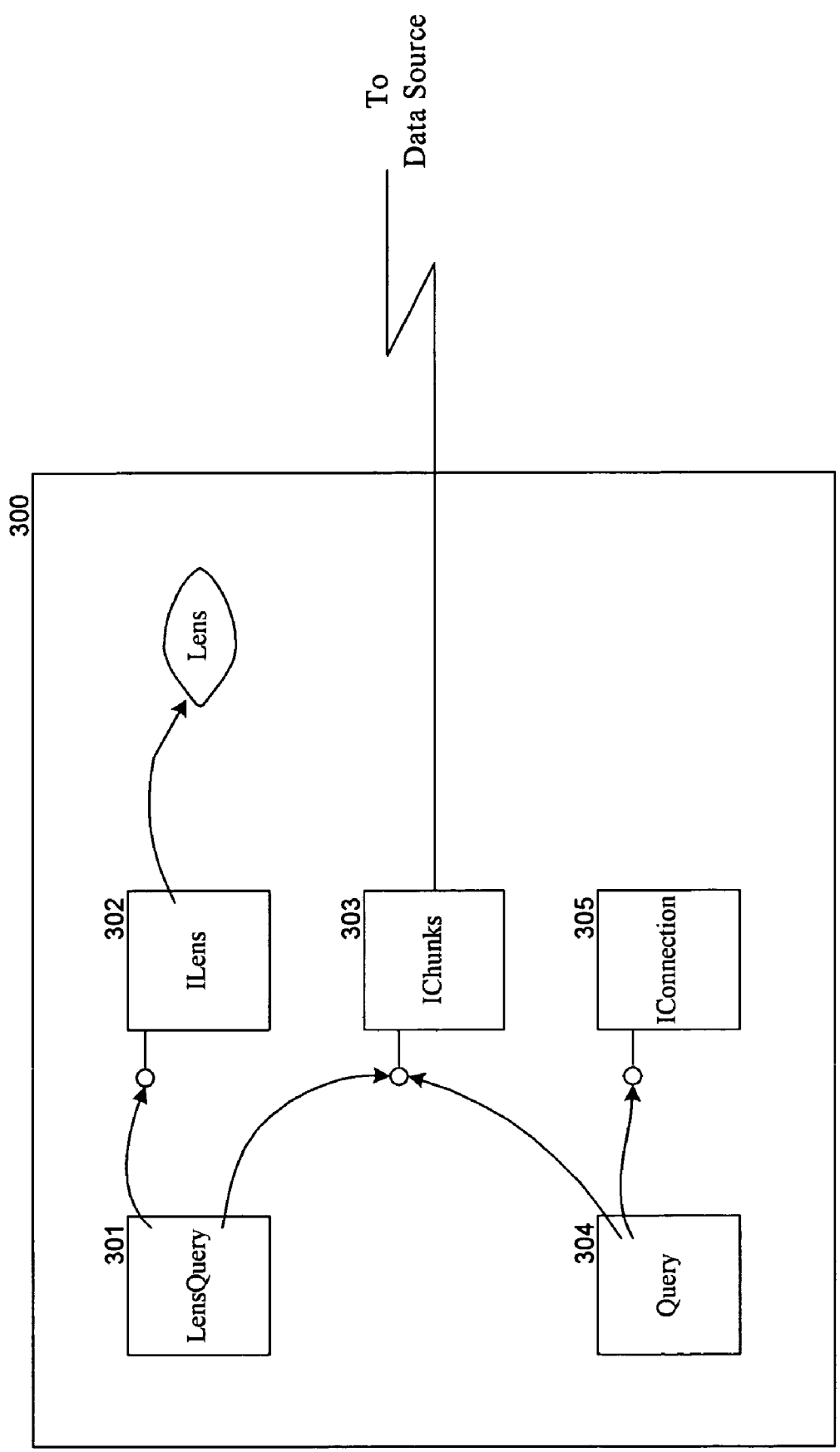
FIG. 3 is a block diagram illustrating an example lens application program interface in one embodiment.

FIG. 3 is a block diagram illustrating an example lens application program interface in one embodiment. The application program 300 may include a lens query module 301 and an instantiation of an ILens interface 302, and of an IChunks interface 303. The lens query module 301 interacts with the instantiated interfaces to affect the execution of a lens. The lens query module first instantiates a lens object, which provides the ILens interface. The ILens interface provides various functions for identifying the parameters and sort values of a lens, setting the parameter and sort values, and executing the query. The ILens interface provides a function for executing the lens and returning a reference to the IChunks interface. The IChunks interface provides functions for retrieving portions of the results that are in either native or canonical format. The lens system also provides an IConnection interface through which queries can be executed without using a lens. The query module 304 instantiates a connection object that connects to a specified query server and returns. The query module may invoke a function of the IConnection interface to set the parameters and sort values (e.g., using an IPreparedStatement interface, which is not shown). The lens query module then invokes the function of the IConnection interface to execute the lens query passing the query to be executed. That function returns a reference to the IChunks interface for accessing the query results.

Figure 4:
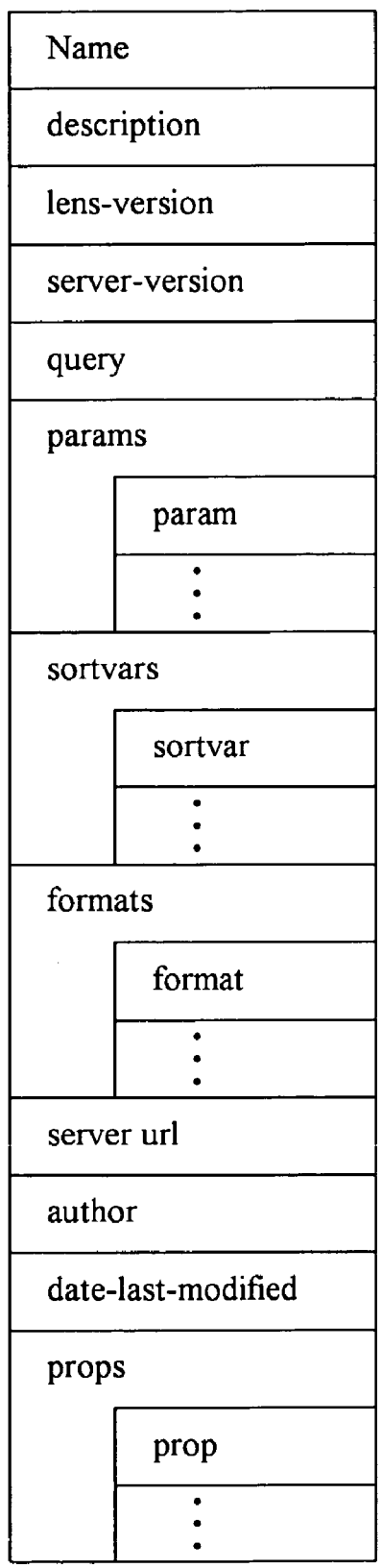
FIG. 4 is a block diagram illustrating the lens format in one embodiment.

FIG. 4 is a block diagram illustrating the lens format in one embodiment. The lens format of 400 includes a name field, a description field, a lens version field, a server version field, a query field, a parameters field, a sort variables field, a formats field, a data source identifier field (i.e., "serverurl"), an author field, a date last modified field and a properties field. The query field specifies the query text. The parameters field includes a parameter field for each parameter. The sort variables field includes a sort variable field indicating how to sort the results of the query. The formats field includes format fields that each contain a results transform. The properties field includes property fields for storing user interface elements and other miscellaneous data. Table 3 illustrates a DTD that defines the lens format.

TABLE 3

Lens Format

| | |
|---|---|
| 1. | <!DOCTYPE lens [ |
| 2. | <!ELEMENT name (#PCDATA) REQUIRED> |
| 3. | <!ELEMENT description (#PCDATA) REQUIRED> |
| 4. | <!ELEMENT lens_version (#PCDATA)> |
| 5. | <!ELEMENT server_version (#PCDATA)> |
| 6. | <!ELEMENT query (#PCDATA) REQUIRED> |
| 7. | <!ELEMENT params (param+)> |
| 8. |   <!ELEMENT param (allowedvalues \| props)*> |
| 9. |   <!ATTLIST param name CDATA REQUIRED> |
| 10. |   <!ATTLIST param value CDATA REQUIRED> |
| 11. |   <!ATTLIST param ignore (true\|false) REQUIRED> |
| 12. |   <!ATTLIST param datatype (int\|float\|string)REQUIRED> |
| 13. |     <!ELEMENT allowedvalues (allowedvalue)+> |
| 14. |       <!ELEMENT allowedvalue (#PCDATA)> |
| 15. |       <!ATTLIST value CDATA REQUIRED> |
| 16. |       <!ATTLIST nice CDATA REQUIRED> |
| 17. |   <!ELEMENT props (prop+)> |
| 18. |     <!ELEMENT prop (#PCDATA)> |
| 19. |     <!ATTLIST prop name CDATA REQUIRED> |
| 20. |     <!ATTLIST prop value CDATA REQUIRED> |
| 21. | <!ELEMENT sortvars (sortvar+)> |
| 22. |   <!ELEMENT sortvar (props*)> |
| 23. |   <!ATTLIST sortvar name CDATA REQUIRED> |
| 24. |   <!ATTLIST sortvar rank CDATA REQUIRED> |
| 25. |   <!ATTLIST sortvar use (yes\|no) REQUIRED> |
| 26. |   <!ATTLIST sortvar order (asc\|desc) REQUIRED> |
| 27. |   <!ELEMENT props (prop+)> |
| 28. |     <!ELEMENT prop (#PCDATA)> |
| 29. |     <!ATTLIST prop name CDATA REQUIRED> |
| 30. |     <!ATTLIST prop value CDATA REQUIRED> |
| 31. | <!ELEMENT formats (format+) REQUIRED> |
| 32. |   <!ELEMENT format (#PCDATA)> |
| 33. |   <!ATTLIST format name CDATA REQUIRED> |
| 34. | <!ELEMENT serverurl (#PCDATA) REQUIRED> |
| 35. | <!ELEMENT author (#PCDATA)> |
| 36. | <!ELEMENT date_last_modified (#PCDATA)> |
| 37. | <!ELEMENT props (prop+)> |
| 38. |   <!ELEMENT prop (#PCDATA)> |
| 39. |   <!ATTLIST prop name CDATA REQUIRED> |
| 40. |   <!ATTLIST prop value CDATA REQUIRED> |
| 41. | ]> |

As illustrated by line 7, the parameters field includes one or more parameter fields as indicated by lines 8–20. Each parameter field may include a name, a value, an ignore and a data type attribute. The ignore attribute indicates whether the parameter is to be used in the query. The data type attribute indicates the data type of the parameter and its possible values such as integer, floating point and string. As indicated by line 8, the parameter field also includes zero or more allowed values and property fields. As indicated by line 13, the allowed values field includes one or more allowed value fields to specify the allowed values for the corresponding parameter. As indicated by line 17, the properties field includes one or more property fields. Each property field defines a property and value associated with the parameter. As indicated by line 21, the sort variables field contains one or more sort variable fields. As indicated by lines 22–26, each sort variable field includes a name, rank, use and order attribute for sorting the query results. As indicated by line 22, each sort variable also includes zero or more property fields. As indicated by lines 32–33, each format field includes a name attribute.

Figure 5:
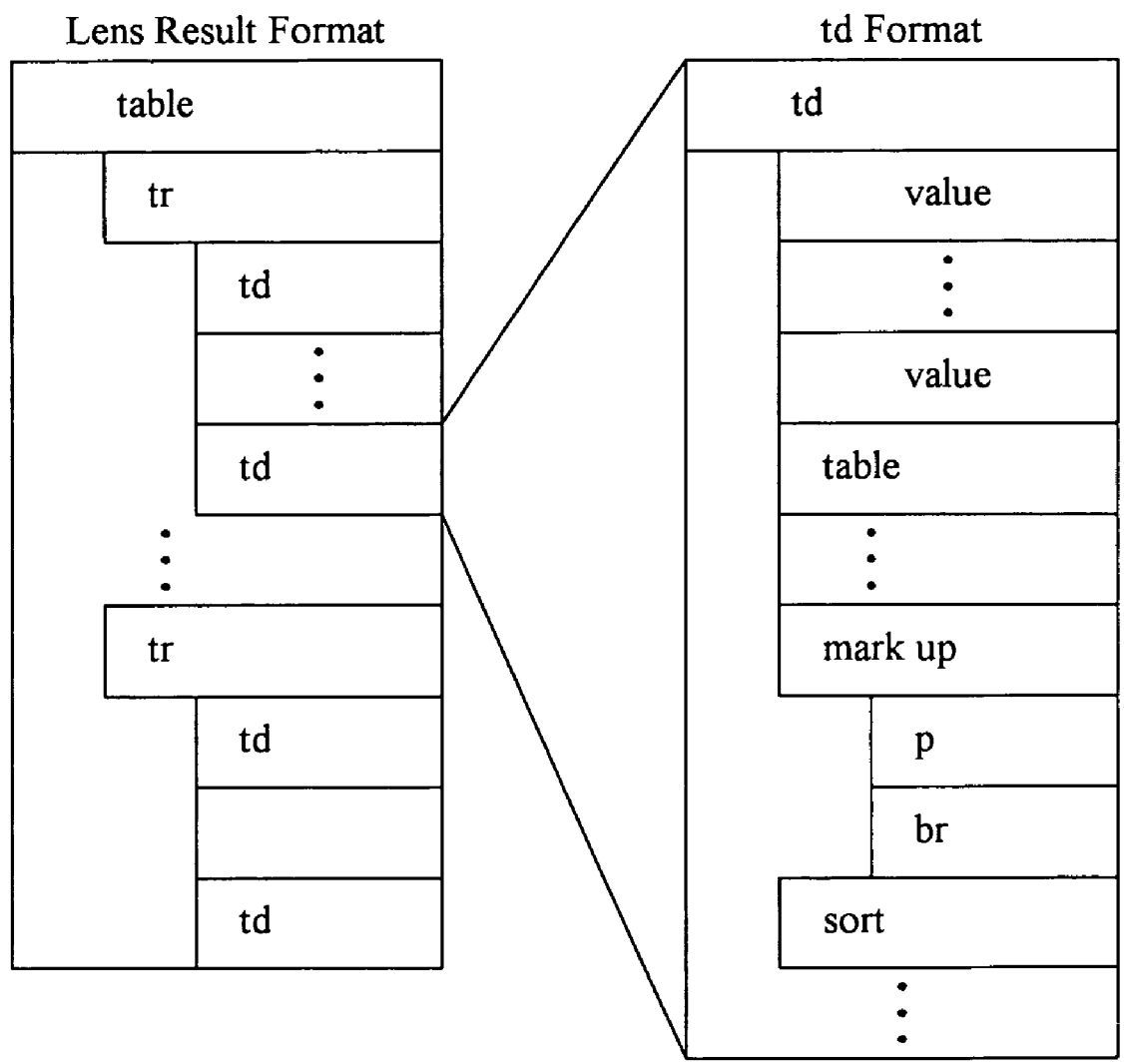
FIG. 5 is a block diagram illustrating the canonical format or lens result format in one embodiment.

FIG. 5 is a block diagram illustrating the canonical format or lens result format in one embodiment. The canonical format represents the results as a table with rows and data values for the rows. The canonical format is a well formed XML document in one embodiment. The table 500 is identified by the "table" tag, the rows are identified by the "tr" tags, and the data values are identified by the "td" tags. The data values 501 may include an individual value as represented by the "value" tag, an embedded table as identified by the "table" tag, markup information as identified by the "markup" tag, or sort data as identified by the "sort" tag. Table 4 illustrates a DTD that more precisely defines a canonical format in one embodiment.

TABLE 4

Lens Results Format

| | |
|---|---|
| 1. | <!DOCTYPE FORMATTING [ |
| 2. |   <!ELEMENT (value \| table \| markup)*> |
| 3. | |
| 4. |   <!ELEMENT value (crosslink*) #PCDATA> |
| 5. |     <!ATTLIST value color CDATA> |
| 6. |     <!ATTLIST value style (b\|i\|bi\|p> |
| 7. |     <!ATTLIST value size CDATA> |
| 8. |     <!ATTLIST value face CDATA> |
| 9. |     <!ATTLIST value dynamic (true\|false)> |
| 10. | |
| 11. |   <!ELEMENT table (tr*)> |
| 12. |     <!ATTLIST table name CDATA #REQUIRED> |
| 13. |     <!ATTLIST table border CDATA> |
| 14. |     <!ATTLIST table cellpadding CDATA> |
| 15. |     <!ATTLIST table cellspacing CDATA> |
| 16. |     <!ATTLIST table bordercolor CDATA> |
| 17. |     <!ATTLIST table valign CDATA> |
| 18. | |
| 19. |   <!ELEMENT tr (td*)> |
| 20. |     <!ELEMENT td (value \| table \| markup \| sort)*> |
| 21. |       <!ATTLIST td id CDATA #REQUIRED> |
| 22. |       <!ATTLIST td colspan CDATA> |
| 23. |       <!ATTLIST td rowspan CDATA> |
| 24. |       <!ATTLIST td align CDATA> |
| 25. |       <!ATTLIST td valign CDATA> |
| 26. | |
| 27. |   <!ELEMENT sort (#PCDATA)> |
| 28. |     <!ATTLSIT sort var CDATA REQUIRED> |
| 29. |     <!ATTLSIT sort dir (ASC\|DESC) REQUIRED> |
| 30. | |
| 31. |   <!ELEMENT markup (p \| br)*> |
| 32. |   <!ELEMENT p> |
| 33. |   <!ELEMENT br> |
| 34. | |
| 35. |   <!ELEMENT crosslink (#PCDATA)> |
| 36. |     <!ATTLIST crosslink lens CDATA REQUIRED> |
| 37. |     <!ATTLIST crosslink param CDATA REQUIRED> |
| 38. |     <!ATTLIST crosslink value CDATA REQUIRED> |
| 39. |     <!ATTLIST crosslink display CDATA> |
| 40. | ]> |

The element of line 2 of Table 4 indicates that the canonical format includes "value," "table," or "markup" tags. The element of line 4 indicates that a value includes zero or more cross links and that a value has attributes of color, style (e.g., bold), size, face (or font) and dynamic (i.e., dynamically generated by the query). The element of line 11 indicates that a table includes "tr" tags and has attributes of name, border and so on. The element of line 19 indicates that each "tr" tag includes zero or more "td" tags. The element of line 20 indicates that "td" tags may recursively include "value," "table," "markup" or "sort" tags. Each "td" tag includes the attributes, identifiers, column span and so on. The element of line 27 indicates sort data that specifies a variable that can be sorted and the direction of sort. For example, <sort var="$shoe_size" dir="ASC">
    <value> foot </value>
  </sort> indicates the output is to be sorted by shoe size when the value of foot is selected. "Foot" may correspond to a column heading, and shoe size may correspond to a database field that is stored in that column. The element of line 35 indicates that a cross link has the attributes of lens, parameter, value and display. A cross link allows one lens to link to another lens. When a user selects a value, an application would typically display the associated cross-linked lens. For example, <crosslink lens="shoeinfo.lens" param="SKU" value="252">
      <value> Morgan Air 2000</value>
    </crosslink> indicates that the lens in the "shoeinfo.lens" file should be executed with the parameter SKU set to 252 when the value "Morgan Air 2000" is selected. Cross links may be used to drill down to retrieve more detailed dates or to display related data.

Table 5 illustrates an example lens in one embodiment. The "lens" tags of lines 1 and 141 delimit the lens, the "query" tags of lines 6 and 50 delimit the query text, the "params" tags of lines 51 and 81 delimit the parameters, the "sortvars" tag of lines 82 and 101 delimit variable sorting information, the "formats" tags of lines 102 and 134 delimit the results transform, and the "props" tags of 135 and 140 delimit the properties.

TABLE 5

Example Lens File

```
1.   <lens>
2.       <name>Weather by Zipcode</name>
3.       <description>Weather by Zipcode</description> >
4.       <lens_version>1.0</lens_version>
5.       <server_version>1.0</server_version>
6.       <query>
7.           <![CDATA[
8.               WHERE
9.                   <msa code=$msacode>
10.                      <zipcode code=$msazip>
11.                          <city>$msacity</>
12.                          <state>$msastate</>
13.                      </>
14.                  </>
15.              IN "ProZipcodeMSA",
16.              ($msazip = ?zipcode?),
17.                  <weather.forecasts>
18.                      <location>
19.                          <city.name msa.code=$weathercode>$CrntCity</>
20.                          <state.code>$CrntState</>
21.                          <country.code>$CrntCountry</>
22.                          <current.condition>
23.                              <time>$time</>
24.                              <current.temp>$CrntTemp</>
25.                              <dew.point>$CrntDew</>
26.                              <rel.humidity>$CrntHumid</>
27.                              <wind.speed>$CrntWindSpd</>
28.                              <wind.direction>$CrntWindDir</>
29.                              <visibility>$CrntVis</>
30.                              <cur.sky.descriptive>$CrntSky</>
31.                          </>
32.                      </>
33.                  </>
34.              IN "Weather", ($weathercode=$msacode)
35.              CONSTRUCT
36.                  <Weather>
37.                      <Current.Data>
38.                          <Location>
39.                              <your.city>$msacity</your.city>
40.                              <closest.city.conditions>$CrntCity</closest.city.conditions>
41.                              <State>$CrntState</State>
42.                              <Country>$CrntCountry</Country>
43.                          </Location>
44.                          <Data>
45.                              <Temperature>$CrntTemp</Temperature>
46.                          </Data>
47.                      </Current.Data>
48.                  </Weather>
49.          ]]>
50.      </query>
51.      <params>
52.          <param
53.              name='zipcode'
54.              value='98105'
55.              ignore='false'
56.              datatype='string'>
57.              <props>
58.                  <prop name='nicename' value='ZIP'>
59.              </props>
60.          </param>
61.          <param
62.              name='city'
```

TABLE 5-continued

Example Lens File

```
63.                    value='Seattle'
64.                    ignore='false'
65.                    datatype='string'>
66.                </param>
67.                <param
68.                    name='state'
69.                    value='wa'
70.                    ignore='true'
71.                    datatype='string'>
72.                    <allowedvalues>
73.                        <allowedvalue value='or' nice='OR'>
74.                        </allowedvalue>
75.                        <allowedvalue value='wa' nice='WA'>
76.                        </allowedvalue>
77.                        <allowedvalue value='nv' nice='NV'>
78.                        </allowedvalue>
79.                    </allowedvalues>
80.                </param>
81.            </params>
82.            <sortvars>
83.                <sortvar
84.                    name='$zipcode'
85.                    rank='0'
86.                    use='no'
87.                    order='asc'>
88.                </sortvar>
89.                <sortvar
90.                    name='$city'
91.                    rank='1'
92.                    use='no'
93.                    order='asc'>
94.                </sortvar>
95.                <sortvar
96.                    name='$state'
97.                    rank='2'
98.                    use='no'
99.                    order='asc'>
100.               </sortvar>
101.           </sortvars>
102.           <formats>
103.               <format name='default'>
104.                   <![CDATA[
105.                       <xsl:stylesheet xmlns:xsl="http://www.w3.org/1999/XSL/Transform">
106.                           <xsl:template match="/">
107.                               <table border="0" cellpadding="2" cellspacing="1" width="100%"
108. bgcolor="#FFFFFF">
109.                                   <tr>
110.                                       <td colspan="8" height="2" bgcolor="#DBDEC9"></td>
111.                                   </tr>
112.                                   <tr>
113.                                       <td class="lensSubhead">Your City</td>
114.                                       <td class="lensSubhead">Closest City</td>
115.                                       <td class="lensSubhead" nowrap="true">Temp.(F)</td>
116.                                   </tr>
117.                                   <xsl:for-each select="//Weather">
118.                                   <tr>
119.                                       <td class="lensBody"><xsl:value-of
120. select="Current.Data/Location/your.city"/>, <xsl:value-of
121. select="Current.Data/Location/State"/></td>
122.                                       <td class="lensBody"><xsl:value-of
123. select="Current.Data/Location/closest.city.conditions"/>, <xsl:value-of
124. select="Current.Data/Location/State"/></td>
125.                                       <td class="lensBody"><xsl:value-of
126. select="Current.Data/Data/Temperature"/></td>
127.                                   </tr>
128.                                   </xsl:for-each>
129.                               </table>
130.                           </xsl:template>
131.                       </xsl:stylesheet>
132.                   ]]>
133.               </format>
134.           </formats>
135.           <serverurl>http://cook/gimmejack</serverurl>
136.           <author>Mark</author>
137.           <date_last_modified>6/12/00</date_last_modified>
138.           <props>
139.               <prop name='chunknum' value='5'></prop>
```

TABLE 5-continued

Example Lens File

140.   </props>
141. </lens>

Table 6 illustrates example results in native format. Native or raw format refers to the format of the data as returned from the data source. The results transform transforms the native format to the canonical format. If a lens does not include a results transform, then the lens system may apply a standard results transform. The standard results transform may transform the native results by representing the highest-level tag as a table, each next level tag as a column of the table, each next lower level tag as a row of a column and so on. The data source delimited the results with the "news" tags of lines 1 and 30. The children of the "news" tags use the "background" tags of lines 2 and 5 and the "story" tags of lines 6 and 13, 14 and 21, and 22 and 29. The "story" tags include child tags that delimit data relating to the story.

TABLE 6

Example Results in Native Format

1.  <News>
2.    <Background>
3.      <Company>Goldman Sachs</Company>
4.      <Event>Equity Investment</Event>
5.    </Background>
6.    <story id='1'>
7.      <title>TITLE ONE</title>
8.      <date>01/01/1999</date>
9.      <city>Seattle</city>
10.     <state>WA</state>
11.     <text>First story text</text>
12.     <url>http://www.one.com</url>
13.   </story>
14.   <story id='2'>
15.     <title>TITLE TWO</title>
16.     <date>02/02/1999</date>
17.     <city>Portland</city>
18.     <state>OR</state>
19.     <text>Seconds story text</text>
20.     <url>http://www.two.com</url>
21.   </story>
22.   <story id='3'>
23.     <title>TITLE THREE</title>
24.     <date>03/03/1999</date>
25.     <city>Las Vegas</city>
26.     <state>NV</state>
27.     <text>Third story text</text>
28.     <url>http://www.three.com</url>
29.   </story>
30. </News>

Table 7 illustrates the example results of Table 6 transformed into the canonical format. The results include a "news" table delimited by the "table" tags of lines 1 and 114. The "news" table contains two columns with the values of "Background" and "Story" in the first row as indicated by the "tr" tags of lines 2 and 11. The "sort" tags of lines 4 and 6 indicate that when the "Background" value is selected the table is to be sorted. The first column contains a "background" table in its second row as indicated by the "tr" tags of lines 12 and 33. The background table includes two columns with two rows as indicated by the "tr" tags of lines 15 and 22 and lines 23 and 30. The second column of the "news" table includes a "story" table in its second row. The "story" table delimited by "table" tags of lines 36 and 111 includes three columns with four rows of data as delimited by the "tr" tags of lines 37 and 47, 48 and 68, 69 and 89, and 90 and 110. The "crosslink" tag of line 56 indicates the lens that is associated with the value of line 55. FIG. 6 illustrates a visual representation of Table 7. "News" table 600 includes columns 601 and 605 with two rows each. The first row lists the titles for the columns, and the second rows include a table 602 in the first column and a table 606 in the second column. Each table of the second row includes its own rows and columns.

TABLE 7

Example Results in Canonical Format

1.  <table name=News>
2.    <tr>
3.      <td>
4.        <sort var="$n" dir="ASC">
5.          <value>Background</value>
6.        </sort>
7.      </td>
8.      <td>
9.        <value>Story</value>
10.     </td>
11.   </tr>
12.   <tr>
13.     <td>
14.       <table name=Background>
15.         <tr>
16.           <td>
17.             <value>Company</value>
18.           </td>
19.           <td>
20.             <value>Event</value>
21.           </td>
22.         </tr>
23.         <tr>
24.           <td>
25.             <value>Goldman Sachs</value>
26.           </td>
27.           <td>
28.             <value>Equity Investment</value>
29.           </td>
30.         </tr>
31.       </table>
32.     </td>
33.   </tr>
34.   <tr>
35.     <td>
36.       <table name=Story>
37.         <tr>
38.           <td>
39.             <value>Title, Date</value>
40.           </td>
41.           <td>
42.             <value>City, State</value>
43.           </td>
44.           <td>
45.             <value>Text, URL</value>
46.           </td>
47.         </tr>
48.         <tr>
49.           <td>
50.             <value>Title1</value>
51.             <value>, </value>
52.             <value>01/01/99</value>
53.           </td>
54.           <td>

TABLE 7-continued

Example Results in Canonical Format

```
55.                    <value>Seattle</value>
56.                    <crosslink
57.                        lens='http://cook/city.lens'
58.                        param='city'
59.                        value='seattle'>
60.                    <value>, </value>
61.                    <value>WA</value>
62.                </td>
63.                <td>
64.                    <value>First Story</value>
65.                    <value>, </value>
66.                    <value>http://www.one.com</
                        value>
67.                </td>
68.            </tr>
69.            <tr>
70.                <td>
71.                    <value>Title2</value>
72.                    <value>, </value>
73.                    <value>02/02/99</value>
74.                </td>
75.                <td>
76.                    <value>Portland</value>
77.                    <crosslink
78.                        lens='http://cook/
                            news.lens'
79.                        param='city'
80.                        value='seattle'>
81.                    <value>, </value>
82.                    <value>OR</value>
83.                </td>
84.                <td>
85.                    <value>Second Story</value>
86.                    <value>, </value>
87.                    <value>http://www.two.
                        com</value>
88.                </td>
89.            </tr>
90.            <tr>
91.                <td>
92.                    <value>Title3</value>
93.                    <value>, </value>
94.                    <value>03/03/99</value>
95.                </td>
96.                <td>
97.                    <value>Las Vegas</value>
98.                    <crosslink
99.                        lens='http://cook/news.lens'
100.                       param='city'
101.                       value='seattle'>
102.                   <value>, </value>
103.                   <value>NV</value>
104.               </td>
105.               <td>
106.                   <value>Third Story</value>
107.                   <value>, </value>
108.                   <value>http://www.three.com</
                       value>
109.               </td>
110.           </tr>
111.       </table>
112.     </td>
113.   </tr>
114. </table>
```

Examples 1–3 illustrate example adjustments to the query text when certain parameters are unused. These adjustments to a query account for unused parameters to more accurately represent a user's intent than prior techniques that may have required a user to enter a "don't care" indicator as the parameter value. In Example 1, the query text includes a ZIP code, city and state parameters. The first expression of this query is satisfied when the ZIP code or city of the data matches the parameter values. The second expression is satisfied when the state matches the parameter value. The query is satisfied when both the first and second expressions are satisfied. In this example, the query is satisfied when the ZIP code is 98105 or the city is Seattle. The state parameter is unused. The portion of the query that includes the state parameter is removed from the resulting query as shown by the result row. The API calls, described below in detail, are used to set the parameter values and shown by the API calls row.

EXAMPLE 1

| | |
|---|---|
| XML-QL Excerpt | ($zipcode = #!zipcode!#) OR ($city = #!city!#), ($state eq #!state!#) |
| API Calls | ```Iterator it = lens.getParameters( );
while(it.hasNext( )) {
    IParameter p = (IParameter)it.next( );
    if (p.getName( ).equals("zip")) {
        p.setValue("98105");
    }
    else if (p.getName( ).equals("city")) {
        p.setValue("Seattle");
    }
    else if (p.getName( ).equals("state")) {
        p.setIgnored(true);
    }
}``` |
| Result | ($zipcode = 98105) OR ($city = 'Seattle') |

Example 2 illustrates a more complex query with an unused parameter. In this example, the auto parameter is unused. As a result, only the first expression of the query is represented in the resulting query.

EXAMPLE 2

| | |
|---|---|
| XML-QL Excerpt | (($consumption > #!miles!#/#!gallon!#) OR ($price > #!price!#)), ($automatic = #!auto!#) |
| API Calls | ```Iterator it = lens.getParameters( );
while(it.hasNext( )) {
    IParameter p = (IParameter)it.next( );
    if (p.getName( ).equals
        ("miles")) {
        p.setValue(new Integer(10));
    }
    else if (p.getName( ).equals("gallon")) {
        p.setValue(new Integer(2));
    }
    else if (p.getName( ).equals("price")) {
        p.setValue(new Integer(120));
    }
    else if (p.getName( ).equals("auto")) {
        p.setIgnored(true);
    }
}``` |
| Result | (($consumption > 10/2) OR ($price > 120)) |

Example 3 illustrates another query with an unused parameter. In this example, the gallon parameter is left unused. As a result, the consumption parameter value cannot be calculated. The resulting query does not include that portion of the expression.

EXAMPLE 3

| | |
|---|---|
| XML-QL Excerpt | (($consumption > #!miles!#/#!gallon!#) OR ($price > #!price!#)), ($automatic = 'no') |
| API Calls | Iterator it = lens.getParameters( );<br>while(it.hasNext( )) {<br>    IParameter p = (IParameter)it.next( );<br>    if (p.getName( ).equals("miles")) {<br>        p.setValue(new Integer(10));<br>    }<br>    else if (p.getName( ).equals("price")) {<br>        p.setValue(new Integer(6000));<br>    }<br>    else if (p.getName( ).equals("gallon")) {<br>        p.setIgnored(true);<br>    }<br>} |
| Result | ($price>6000),($automatic = 'no') |

Tables 8–14 illustrate the application programming interface for the lens system in one embodiment. In the following paragraphs, the primary functions of the APIs will be described. One skilled in the art will understand the purpose of the various functions based on their descriptive names. Table 8 illustrates the functions of the class factory for the ILens interface. The LensProvider class provides functions that input a query definition (e.g., a lens) and returns a reference to the ILens interface and functions to return a list of the lenses and directories within a directory.

TABLE 8

| Lens Provider |
|---|
| class LensProvider {<br>    static ILens getLens(String name);<br>    static ILens fromString(String lensXML);<br>    string [ ] listLenses (string path);<br>    string [ ] listDivs (string path)<br>} |

Table 9 illustrates the functions of the ILens interface in one embodiment. This interface allows for the loading, saving, and modifying of a lens. In addition, this interface provides functions for storing the state of the lens in a file. The save function persistently stores the current state of the lens. The releaseResources function releases locks on the file or object of origin. The get and set server functions get and set the server URL of the lens. The getQuery function retrieves the query text from the lens and returns it as a string. The toString function returns the entire contents of the lens as a string. The execute function executes the lens and returns its results. The executeToChunks function returns a reference to the IChunks interface so that only a portion (i.e., a chunk) of the results can be retrieved at a time. The executeToDOM function executes the lens and returns the results as a DOM document. One skilled in the art will understand the behavior of the other functions from their descriptive names.

TABLE 9

| ILens |
|---|
| interface ILens {<br>    void save( );<br>    void releaseResources( );<br>    String getServerUrl( ); |

TABLE 9-continued

| ILens |
|---|
|     void setServerUrl(String serverUrl);<br>    String getQuery( );<br>    String toString( );<br>    Iterator getParameters( );<br>    Iterator getSortVariables( );<br>    Properties getProperties( );<br>    String getName( );<br>    String getDescription( );<br>    String getAuthor( );<br>    Date getDateLastModified( );<br>    String execute(String formattingname);<br>    IChunks executeToChunks(String formattingname);<br>    XMLDocument executeToDOM( );<br>} |

Table 10 illustrates the functions of a class factory for the IConnection interface in one embodiment. The getConnection function is passed an identifier of the query server (e.g., data source), a user identifier and a password. The function establishes a connection with the query server and returns an instance of the IConnection interface. Each IConnection object that is instantiated by the same ConnectionManager object will log its information to the same device.

TABLE 10

| Connection Manager |
|---|
| class ConnectionManager {<br>    static IConnection getConnection(<br>        String serverURL,<br>        String user<br>        String password);<br>} |

Table 11 illustrates the functions of the IConnection interface in one embodiment. The execute function returns a reference to an IChunks interface so that the results from executing the passed query against the passed datasource can be retrieved. The getPreparedStatement function prompts for parameter values and sort variables before the passed query is executed.

TABLE 11

| IConnection |
|---|
| interface IConnection {<br>    IChunks execute (String xmlql, String data source)<br>    IPreparedStatement getPreparedStatement (String xmlql, String dataSource)<br>    void close( );<br>} |

Table 12 illustrates the functions of the IParameter interface that is used to set and get the attributes and properties associated with a parameter. A reference to this interface is returned by the parameter iterator.

TABLE 12

| IQuery |
|---|
| lass IParameter {<br>    static final int INTEGER = 1;<br>    static final int STRING = 2;<br>    static final int FLOAT = 3;<br>    static final int DATE = 4; |

TABLE 12-continued

IQuery

```
    int getType( );
    boolean isIgnored( );
    void setIgnored( );
    String getName( );
    Object getValue( );
    void setValue(Object value);
    Properties getProperties( );
}
```

Table 13 illustrates the functions of the ISort Variable interface. The ISort Variable interface is used to set and get the attributes of the sort variables. A reference to this interface is returned by the sort variable iterator.

TABLE 13

ISortVariable

```
class ISortVariable {
    int getRank( );
    void setRank(int rank);
    boolean isUsed( );
    void setUsed(Boolean use);
    String getName( );
    Boolean isDesc( );
    Void setDesc(boolean desc);
    Properties getProperties( );
}
```

Table 14 illustrates the functions of the IChunks Interface. The functions of the interface are used to retrieve portions of the query results. Each portion may be transferred using the results transform. Alternatively, a server-side query processor could generate the query results, apply the transform, and then send the transformed results a portion at a time. Some of the functions are passed an index to indicate the chunk number to be retrieved.

TABLE 14

IChunks

```
interface IChunks {
    void close( );
    org.w3c.dom.DocumentFragment getNextChunkToDOM( );
    org.w3c.dom.DocumentFragment getPreviousChunkToDOM( );
    org.w3c.dom.DocumentFragment getChunkToDOM(int index);
    String getNextChunk( );
    String getPrevious( );
    String getChunk(int index);
}
```

Table 15 illustrates the IPreparedStatement interface. The getParameter and getSortVariables functions are used to set parameter values and sort variables. The execute function executes the query and returns a reference to the IChunks interface for retrieving the results of the query.

TABLE 15

```
interface IpreparedStatement {
    iterator getParameters( );
    iterator getSortVariables( );
    IChunks execute( );
}
```

To execute a lens, an application program uses a LensProvider object to load a lens from a file or to create a lens object from an XML representation of the lens. The application program then uses the ILens interface returned by the LensProvider object to optionally change parameter values and sort keys. The application program executes the lens by invoking the executeToChunks function of the ILens function. That function returns a reference to the IChunks interface. The application program can then use the function of the IChunks interface to retrieve the result of the query.

To execute an XML-QL that is not stored as a lens, the application program uses a ConnectionManager object to retrieve a reference to an IConnection interface. The application program then invokes the execute function or PreparedStatement function. The execute function returns a reference to an IChunks interface. The PreparedStatement function returns an IPreparedStatement interface that allows for parameters to be set before the query is executed. After the parameter values are set, the application program invokes the execute function of the IPreparedStatement interface to execute the function and return a reference to an IChunks interface for retrieving the results. If parameters or sort variables are not to be set, then the application program can invoke the execute function of the IConnection interface.

Figure 7:
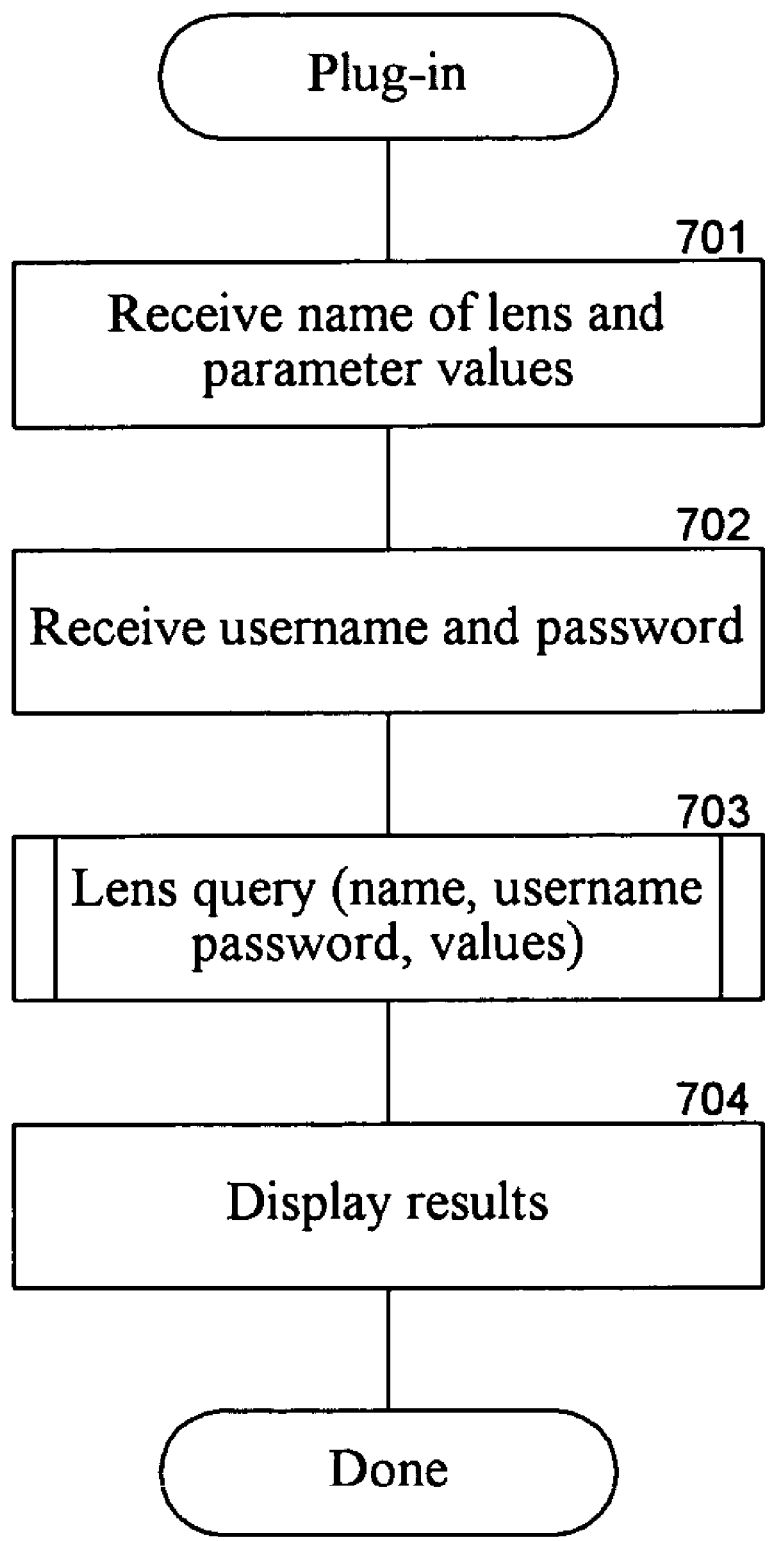
FIG. 7 is a flow diagram illustrating the processing of the lens by a plug-in to an application program, such as a browser.

FIGS. 7–14 are flow diagrams illustrating the use of lenses in one embodiment. FIG. 7 is a flow diagram illustrating the processing of lenses by a plug-in to an application program, such as a browser. This plug-in receives the identification of the lens, a user name and password from a user, executes the lens, and displays results. In block 701, the plug-in receives the name of the lens and the parameter values from a user. In one embodiment, the plug-in uses the ILens interface to identify the parameters of the lens, to retrieve the default values, and to set the parameter values before executing the lens. In block 703, the plug-in invokes the LensQuery function passing the name of the lens, the user name, the password and the parameter values. The LensQuery function executes the lens and returns the results. In block 704, the plug-in displays the results and completes.

Figure 8:
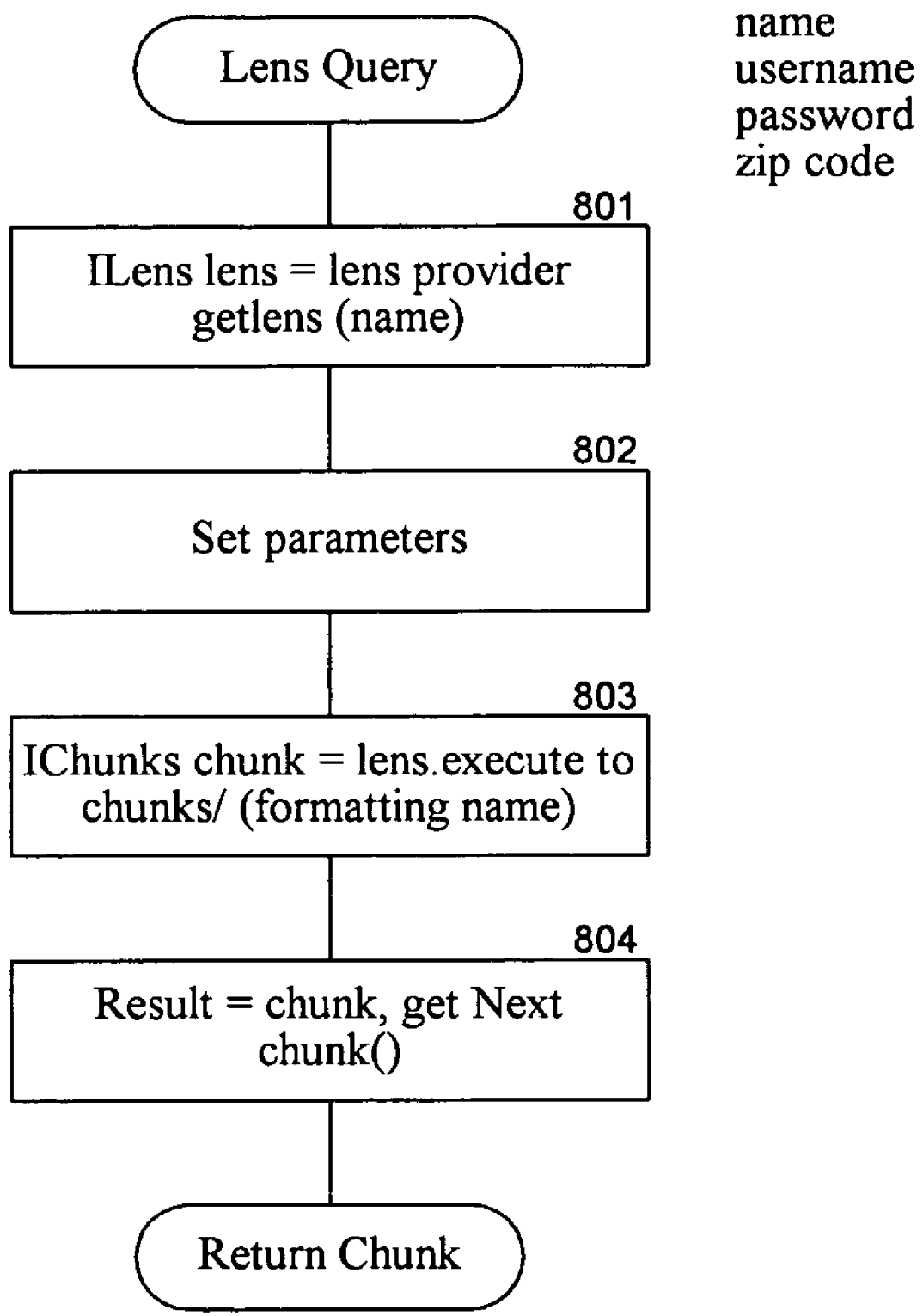
FIG. 8 is a flow diagram of the Lens Query function in one embodiment.

FIG. 8 is a flow diagram of the LensQuery function in one embodiment. This function is passed the name of lens, the user name, the password and selected parameter values (e.g., ZIP code). The function returns the results after execution of the lens. In block 801, the function invokes a function of the class factory for the ILens interface. That function returns a reference to an instance of the ILens interface for the lens identified by the passed name. In block 802, the function sets the parameter values by invoking a setParameter function which is described below. In block 1803, the function invokes the executeToChunks function of the ILens interface which returns a reference to the IChunks interface. In block 1804, the function invokes the getNextChunk function of the IChunks interface to retrieve the results. This invoking may be repeated for each successive chunk to be retrieved. The function then returns. In one embodiment, the possible values of a parameter are stored in the lens. In this way, the plug-in could use the Lens API to retrieve those possible values and then display the values to a user for selection. Alternatively, the executeToChunks function of the ILens interface could prompt for the parameter values. In block 702, the plug-in receives the user name and password from the user.

Figure 9:
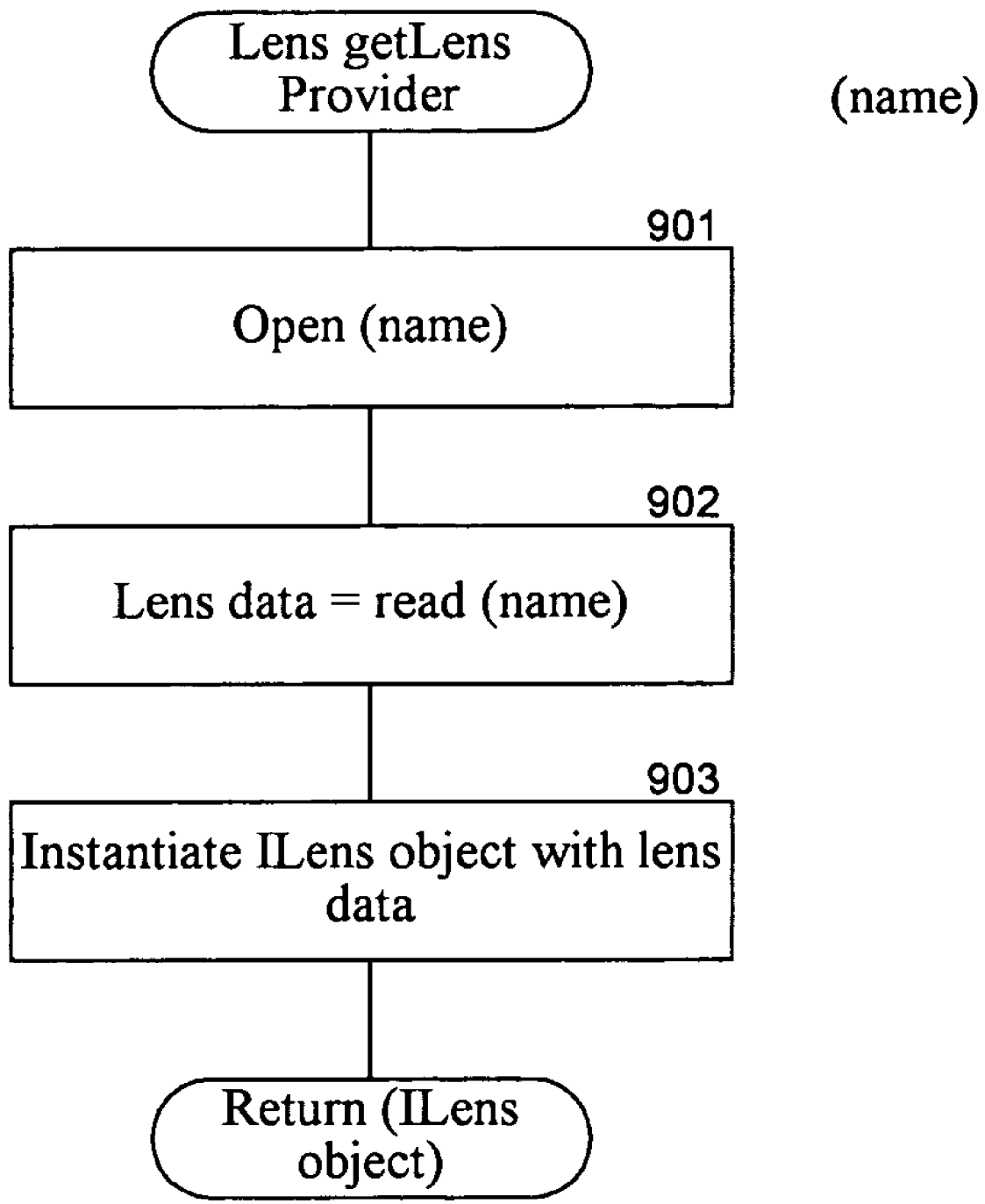
FIG. 9 is a flow diagram illustrating a function of the ILens class factory in one embodiment.

FIG. 9 is a flow diagram illustrating a function of the ILens class factory in one embodiment. This function is passed the name of the lens and returns a reference to an ILens interface. In block 901, the function opens the lens. In block 902, the function reads in the contents of the lens. In block 903, the function instantiates an ILens object and initializes the object with the data retrieved from the lens file. The function then returns a reference to the ILens interface.

Figure 10:
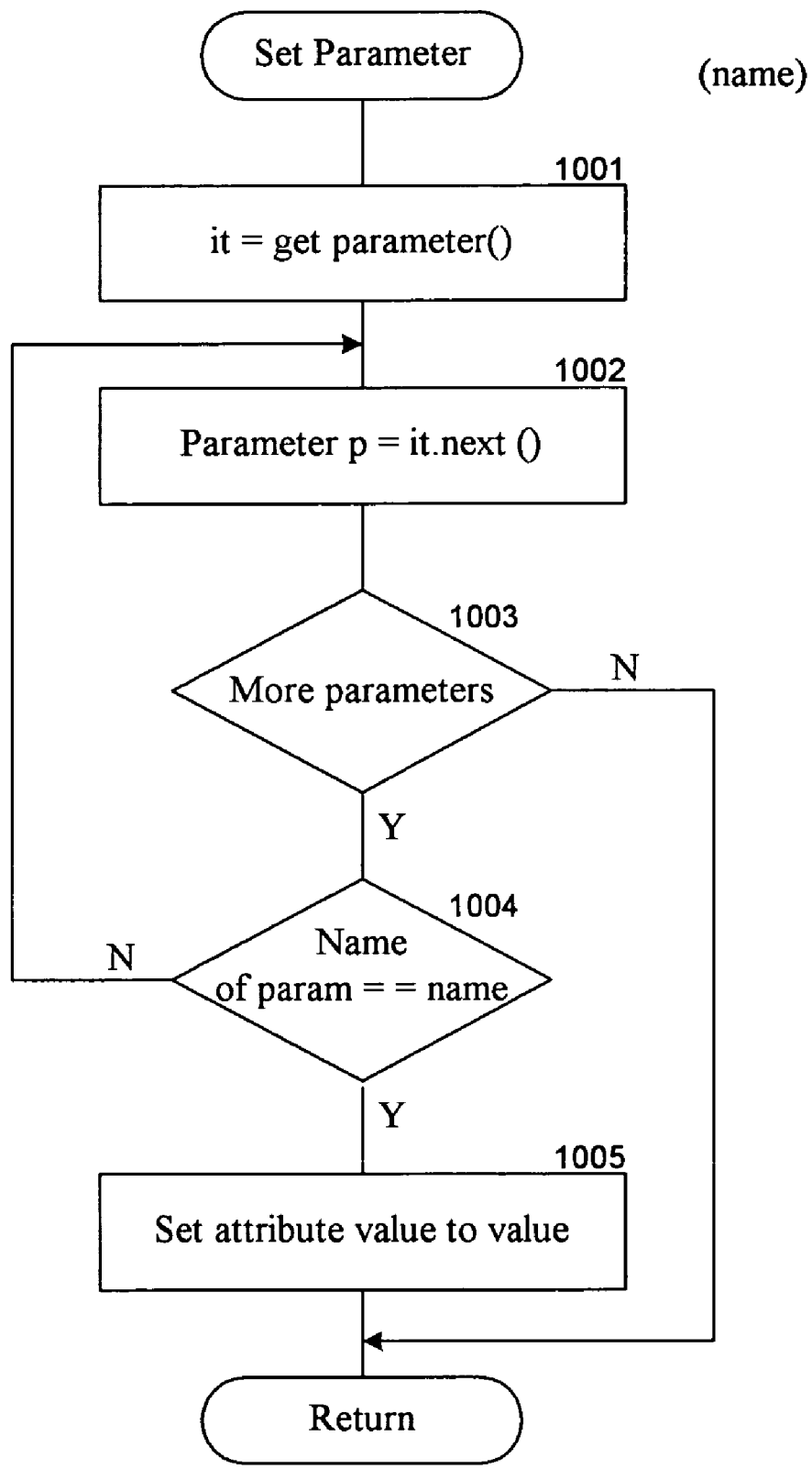
FIG. 10 is a flow diagram illustrating a set parameter function of the ILens interface in one embodiment.

FIG. 10 is a flow diagram illustrating a set parameter function of the ILens interface in one embodiment. A set parameter function is passed the name of the parameter and a parameter value and sets the value of that parameter in the lens. In block 1001, the routine retrieves an iterator for the parameter. In blocks 1002–1004, the function loops locating the parameter of the passed name. In block 1002, the function invokes the next function of the iterator to retrieve the next parameter. In decision block 1003, if all of the parameters have already been selected, then the function returns, else the function continues at block 1004. In decision block 1004, if the name of the parameter is the same as the passed name, then the function continues at block 1004, else the function loops to block 1002 to select the next parameter. In block 1005, the function sets the "value" attribute as the selected parameter to the passed value and then returns. Alternately, the setting of parameter values could be provided through a function of the ILens interface that is passed the name of the parameter and the value, rather than using an iterator.

Figure 11:
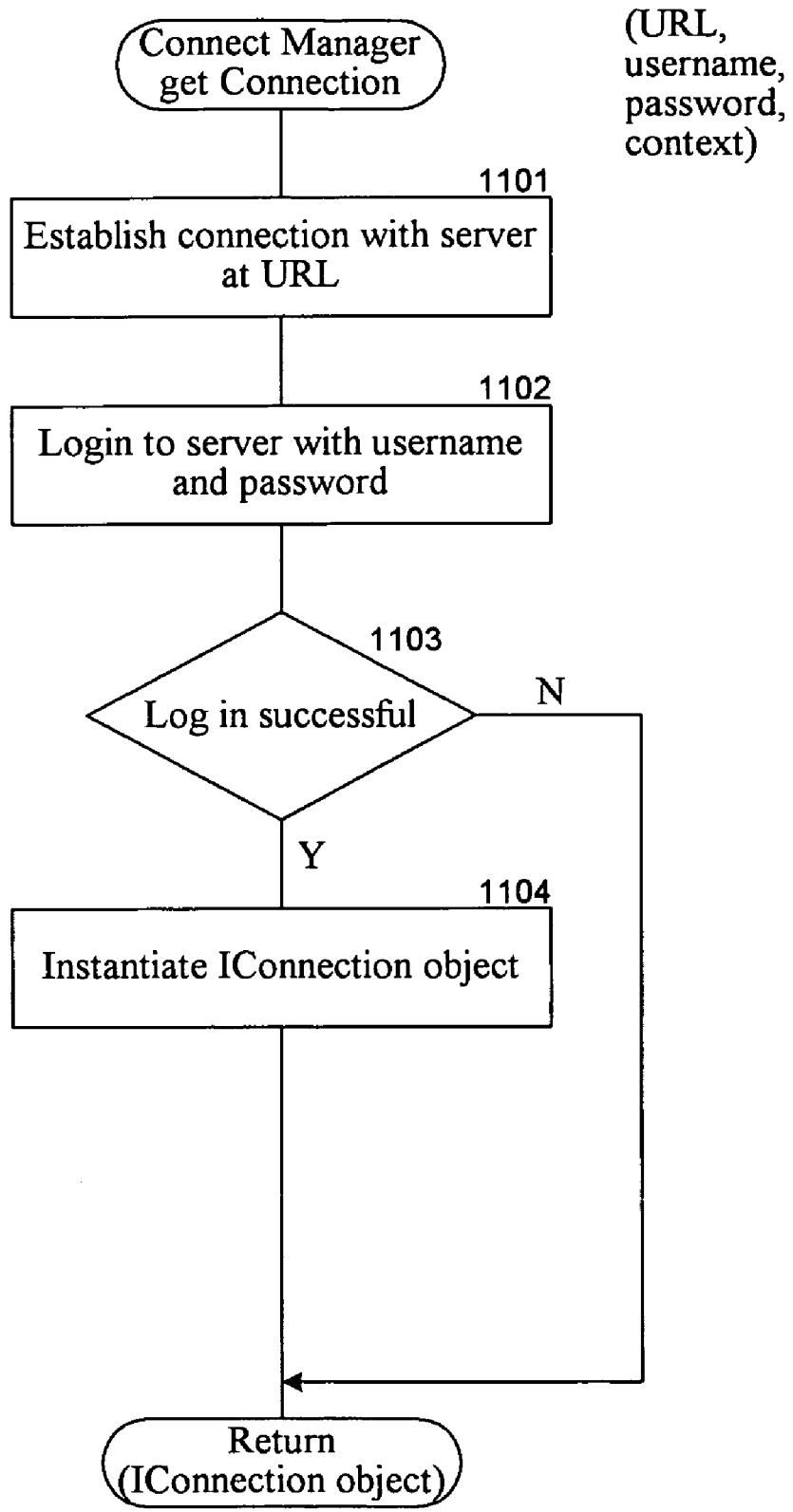
FIG. 11 is a flow diagram of the getConnection function of the ConnectionManager class into one embodiment.

FIG. 11 is a flow diagram of the getConnection function of the ConnectionManager class into one embodiment. This function is passed the URL of the query server, the user name and password. In block 1101, the function establishes a connection with the query server at the passed URL using the passed context. In block 1102, the function logs on to the server with the user name and password. In decision block 1103, if the logon is successful, the function continues at block 1104, else the function returns. In block 1104, the function instantiates the IConnection object and then returns with a reference to the IConnection interface.

Figure 12:
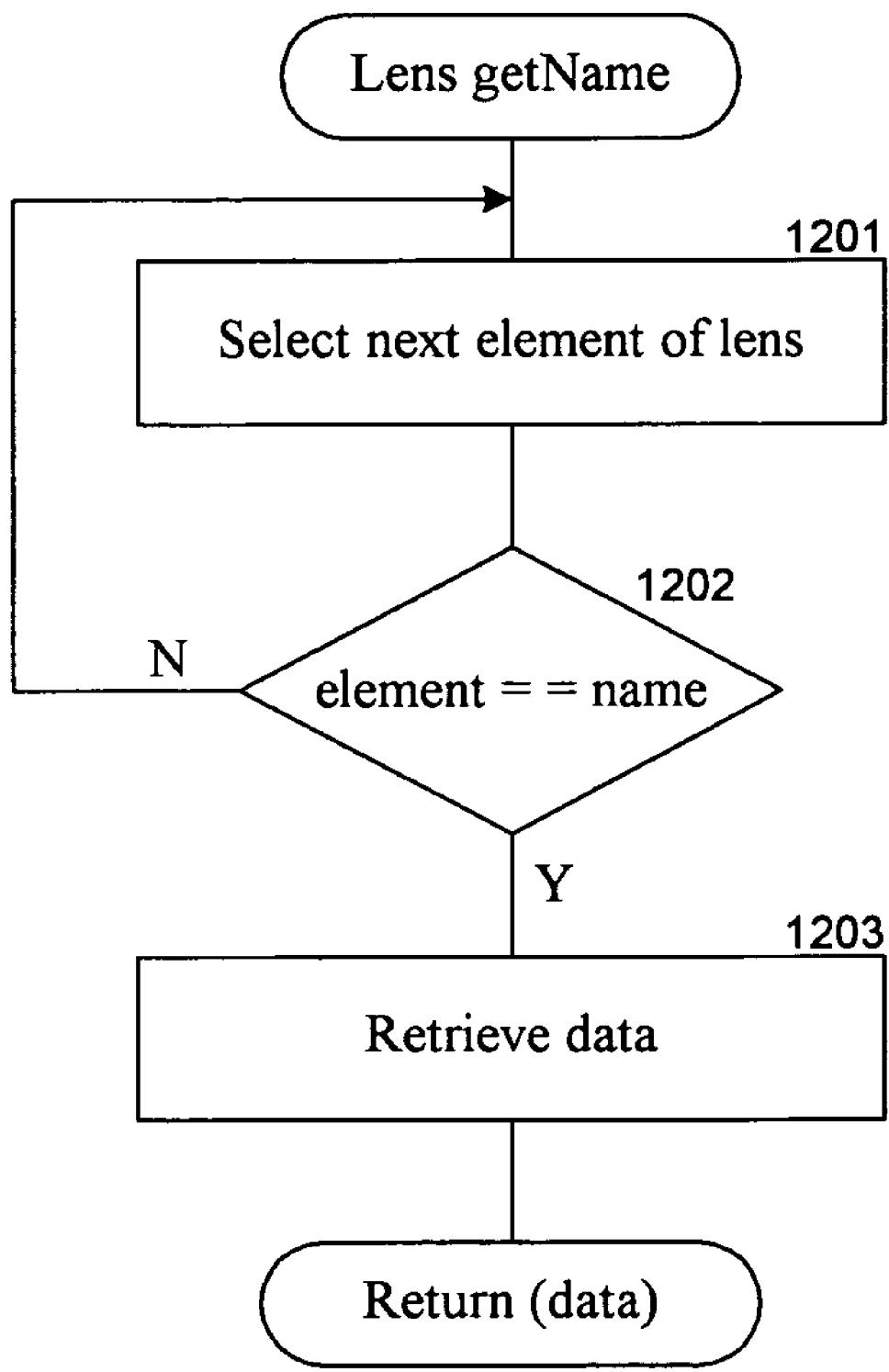
FIG. 12 is a flow diagram illustrating the getName function of the ILens interface in one embodiment.

FIG. 12 is a flow diagram illustrating the getName function of the ILens interface in one embodiment. This flow diagram illustrates the processing of the get field functions of the ILens interface by showing the processing for the name field. In block 1201, the routine selects the next element of the lens file. In decision block 1202, if the tag of the next element is "name," then the function continues at block 1203, else the function loops to block 1201 to select the next element. In block 1203, the function retrieves the name data and returns.

Figure 13:
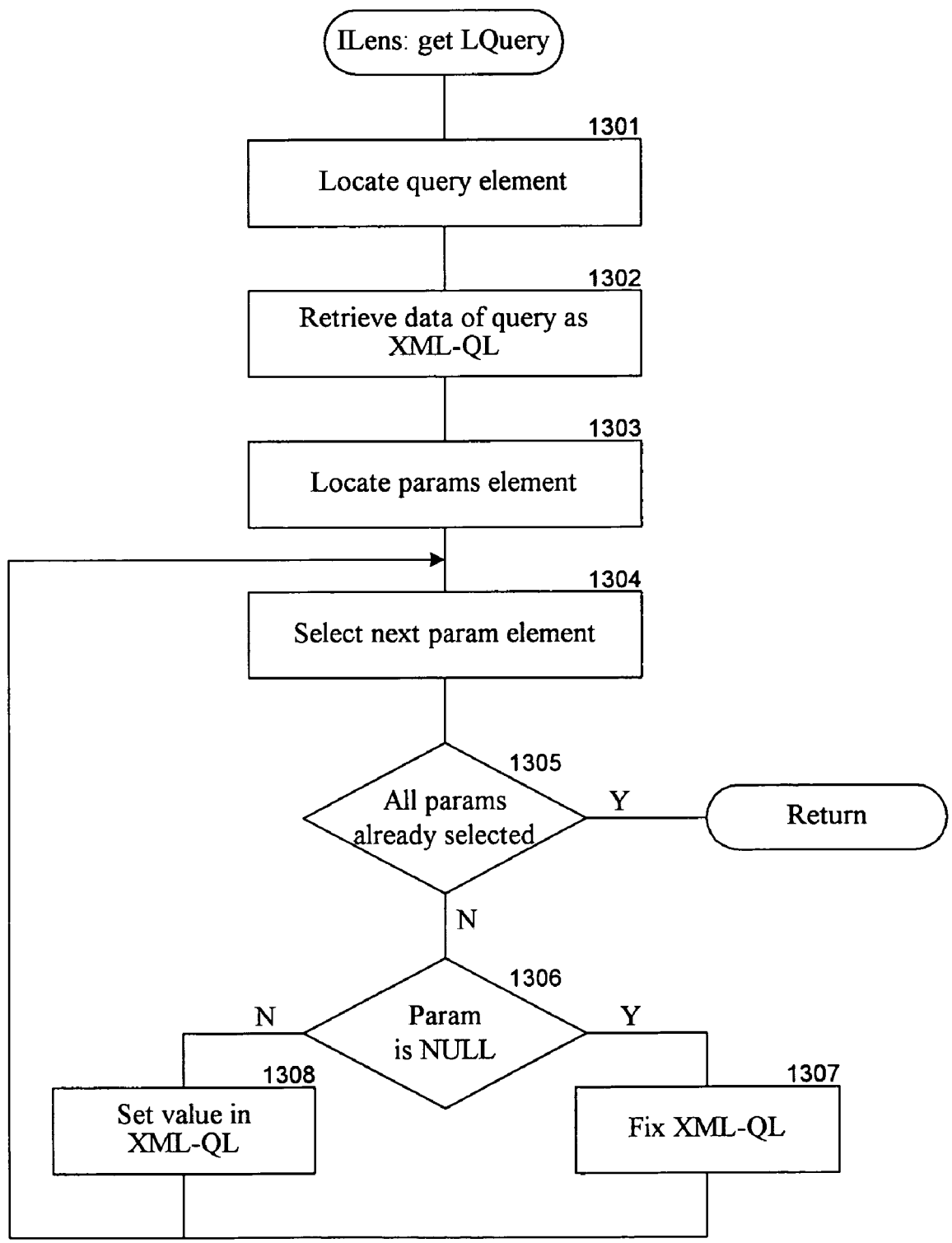
FIG. 13 is a flow diagram of the getQuery function of the ILens interface in one embodiment.

FIG. 13 is a flow diagram of the getQuery function of the ILens interface in one embodiment. In block 1301, the function locates the query text element of the lens file. In block 1302, the function retrieves the data of the query text element. In block 1303, the function locates the "params" element in of the lens file. In blocks 1304–1308, the function loops processing each "param" element of the lens file. In block 1304, the function selects the next "param" element. In decision block 1305, if all the "param" elements have already been selected, then the function returns, else the function continues at block 1306. In block 1306, if the value associated with the selected "param" element is null or unused, then the function continues at block 1307, else the function continues at block 1308. In block 1307, the function adjusts the query based on the setting of the "param" element to null and loops to block 1304 to select the next "param" element. In block 1308, routine sets the parameter value in the selected "param" element and loops to block 1304 to select the next "param" element.

Figure 14:
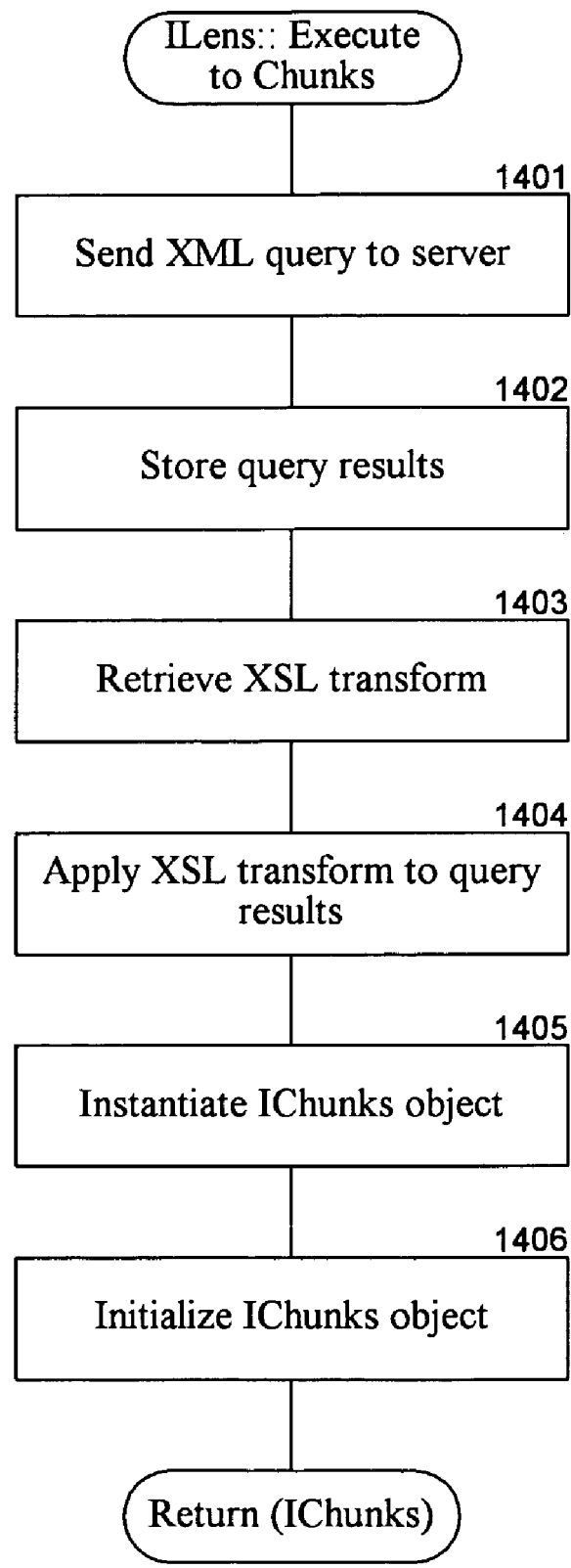
FIG. 14 is a flow diagram of the execute function of the ILens interface in one embodiment.

FIG. 14 is a flow diagram of the execute function of the ILens interface in one embodiment. In block 1501, the function sends the XML query to the query server. In block 1502, the function receives and stores query results. In block 1503, the function retrieves the results transform from the lens file. If not present in the lens, then the function retrieves a standard results transform. In block 1504, the function applies the results transform to the query results. In blocks 1405–1406, the function initiates an IChunks object and initializes it with the transformed query results. The function then returns a reference to the IChunks interface.

From the above description it will be appreciated that although specific embodiments of the technology have been described for purposes of illustration, various modifications may be made without deviating from the spirit and scope of the invention. For example, one skilled in the art would appreciate that the results of the execution of lens can be used in many different ways. The results could be displayed (as described above), stored in a database for further processing, stored in a spreadsheet, be used as the source of another lens query and so on. Accordingly, the invention is not limited, except by the appended claims.

The invention claimed is:

1. A computer-readable medium containing a data structure defining a query definition, the data structure including:
   a query specification including query text and parameters, the parameters having values that may be set by a user before or when the query definition is executed;
   a results transform that transforms results of executing the query specification into a canonical format; and
   a data source identifier that identifies a data source to be used when the query specification is executed;
   wherein the data structure encapsulates the query definition.

2. The computer-readable medium of claim 1 wherein the results transform is an XSL transform.

3. The computer-readable medium of claim 1 wherein the data structure is represented in XML format.

4. The computer-readable medium of claim 1 wherein the data structure conforms with the following data type definition of XML:

```
<!DOCTYPE lens [
    <!ELEMENT query (#PCDATA) REQUIRED>
    <!ELEMENT params (param+)>
        <!ELEMENT param (allowedvalues | props)*>
        <!ATTLIST param name CDATA REQUIRED>
        <!ATTLIST param value CDATA REQUIRED>
    <!ELEMENT formats (format+) REQUIRED>
        <!ELEMENT format (#PCDATA)>
            <!ATTLIST format name CDATA REQUIRED>
        <!ELEMENT serverurl (#PCDATA) REQUIRED>
    <!ELEMENT sort (#PCDATA)>
        <!ATTLIST sort var CDATA REQUIRED>
        <!ATTLIST sort dir (ASC|DESC) REQUIRED>
    <!ELEMENT markup (p | br)*>
    <!ELEMENT p>
    <!ELEMENT br>
    <!ELEMENT crosslink (#PCDATA)>
        <!ATTLIST crosslink lens CDATA REQUIRED>
        <!ATTLIST crosslink param CDATA REQUIRED>
        <!ATTLIST crosslink value CDATA REQUIRED>
        <!ATTLIST crosslink display CDATA>
]>.
```

5. The computer-readable medium of claim 1 wherein the data structure includes a name.

6. The computer-readable medium of claim 1 wherein the data structure includes a description.

7. The computer-readable medium of claim 1 wherein the data structure includes a version.

8. The computer-readable medium of claim 1 wherein the data structure includes an author.

9. The computer-readable medium of claim 1 wherein the data structure includes a date last modified.

10. The computer-readable medium of claim 1 wherein the data structure can be used by different application programs.

11. The computer-readable medium as recited in claim 1, wherein the query definition can be executed via an API.

12. The computer-readable medium as recited in claim 11, wherein the API provides one or more functions for accessing the query definition.

13. The computer-readable medium as recited in claim 11, wherein the API provides at least one of a function for loading a query definition, a function for setting one or more values of one or more of the parameters of the query definition, and a function for executing the query definition.

14. The computer-readable medium as recited in claim 1, wherein each of the parameters includes an ignore attribute, the ignore attribute indicating whether the parameter is to be used in the query.

15. The computer-readable medium as recited in claim 1, wherein one or more of the parameters has one or more associated allowed values.

16. The computer-readable medium as recited in claim 1, further comprising:
a sort indicator indicating a manner in which the results of executing the query are to be sorted.

17. The computer-readable medium as recited in claim 1, wherein the canonical format includes at least one of a value, table, and markup tags.

18. The computer-readable medium as recited in claim 17, wherein the value has at least one of a color, style, size, font, and dynamic attribute, the dynamic attribute indicating whether the value is dynamically generated by executing the query specification.

19. The computer-readable medium as recited in claim 1, wherein the canonical format includes a sort tag indicating a variable or parameter according to which the results are to be sorted.

20. The computer-readable medium as recited in claim 19, wherein the results are to be sorted according to the variable or parameter when a specified value is selected or specified by a user for the variable or parameter.

21. The computer-readable medium as recited in claim 1, wherein the canonical format includes a cross link, the cross link indicating one or more query definitions having a particular value for one or more of the parameters.

22. The computer-readable medium as recited in claim 1, wherein the canonical format comprises:
a table element having one or more row elements and one or more columns;
for each of the one or more row elements, one or more data elements, each data element corresponding to one of the one or more columns of the table element; and
each data element having one or more values or table elements with row elements and data elements.

23. A method in a computer-system for performing a query, the method comprising:
receiving an indication of a query definition encapsulated by a data structure, the query definition including a query specification and a results transform;
identifying a data source from the query specification;
requesting execution of the query specification with the identified data source to generate results in a raw format; and
transforming the generated results in the raw format to a canonical format using the results transform.

24. The method of claim 23 wherein the query definition includes an indication of the data source and the identifying of the data source includes retrieving the indication from the query definition.

25. The method of claim 23 wherein the query specification includes an indication of a parameter for the query specification and the method includes receiving a value for the parameter, wherein the requesting of the execution of the query specification indicates the value of the parameter.

26. The method of claim 23 wherein the query specification includes an indication of a parameter for the query specification and a value for the parameter.

27. The method of claim 26 including updating the value of the parameter in response to input from a user, wherein the value is stored with the query specification.

28. The method of claim 23 wherein the results transform is an XSL transform.

29. The method of claim 23 wherein the results transform includes instructions for display of the generated results.

30. The method of claim 23 wherein the data structure is represented by the following XML format:

```
<!DOCTYPE FORMATTING [
    <!ELEMENT (table)>
    <!ELEMENT value #PCDATA>
        <!ATTLIST value color CDATA>
        <!ATTLIST value style (b|b|p>
        <!ATTLIST value size CDATA>
        <!ATTLIST value face CDATA>
        <!ATTLIST value dynamic (true|false)>
    <!ELEMENT table (tr*)>
        <!ATTLIST table name CDATA #REQUIRED>
        <!ATTLIST table border CDATA>
        <!ATTLIST table cellpadding CDATA>
        <!ATTLIST table cellspacing CDATA>
        <!ATTLIST table bordercolor CDATA>
        <!ATTLIST table valign CDATA>
    <!ELEMENT tr (td*)>
        <!ELEMENT td (value | table)*>
            <!ATTLIST td id CDATA #REQUIRED>
            <!ATTLIST td colspan CDATA>
            <!ATTLIST td rowspan CDATA>
            <!ATTLIST td align CDATA>
            <!ATTLIST td valign CDATA>
    <!ELEMENT sort (#PCDATA)>
        <!ATTLIST sort var CDATA REQUIRED>
        <!ATTLIST sort dir (ASC|DESC) REQUIRED>
    <!ELEMENT markup (p | br)*>
    <!ELEMENT p>
    <!ELEMENT br>
    <!ELEMENT crosslink (#PCDATA)>
        <!ATTLIST crosslink lens CDATA REQUIRED>
        <!ATTLIST crosslink param CDATA REQUIRED>
        <!ATTLIST crosslink value CDATA REQUIRED>
        <!ATTLIST crosslink display CDATA>
]>.
```

31. The method as recited in claim 23, wherein the identifying of the data source includes obtaining a data source identifier identifying the data source via an API.

32. The method as recited in claim 23, wherein the query definition can be executed via an API.

33. The method as recited in claim 32, wherein the API provides one or more functions for accessing the query definition.

34. The method as recited in claim 32, wherein the API provides at least one of a function for loading a query definition, a function for setting one or more values of one or more parameters of the query definition, and a function for executing the query definition.

35. The method as recited in claim 23, wherein each parameter of the query definition includes an ignore attribute, the ignore attribute indicating whether the parameter is to be used in the query.

36. The method as recited in claim 23, wherein one or more parameters of the query definition has one or more associated allowed values.

37. The method as recited in claim 23, wherein the query definition includes a sort indicator indicating a manner in which the results of executing the query are to be sorted.

38. The method as recited in claim 23, wherein the canonical format includes at least one of a value, table, and markup tags.

39. The method as recited in claim 38, wherein the value has at least one of a color, style, size, font, and dynamic attribute, the dynamic attribute indicating whether the value is dynamically generated by executing the query specification.

40. The method as recited in claim 23, wherein the canonical format includes a sort tag indicating a variable or parameter according to which the results are to be sorted.

41. The method as recited in claim 40, wherein the results are to be sorted according to the variable or parameter when a specified value is selected or specified by a user for the variable or parameter.

42. The method as recited in claim 23, wherein the canonical format includes a cross link, the cross link indicating one or more query definitions having a particular value for one or more parameters of the query definition.

43. The method as recited in claim 23, wherein the canonical format comprises:
   a table element having one or more row elements and one or more columns;
   for each of the one or more row elements, one or more data elements, each data element corresponding to one of the one or more columns of the table element; and
   each data element having one or more values or table elements with row elements and data elements.

44. A computer-readable medium containing a data structure defining a query definition, the data structure comprising:
   a query specification including query text that is an expression of a query; and
   a data source identifier that identifies a data source to be used when the query specification is executed;
   whereby the data structure encapsulates the query definition that can be used by a plurality of different application programs to define a query that is to be executed using the query specification and the data source identified by the data source identifier.

45. The computer-readable medium of claim 44 wherein the data structure further includes a results transform for transforming results of the execution of the query to a canonical format.

46. The computer-readable medium of claim 45 wherein the results transform is an XSL transform.

47. The computer readable medium of claim 44 wherein the data structure is represented in XML format.

48. The computer-readable medium of claim 44 wherein the query specification includes one or more parameters, each of the one or more parameters having one or more values that may be set by a user before or when the query is executed.

49. The computer-readable medium of claim 48 wherein the query specification includes one or more possible values for one or more of the parameters.

50. The computer-readable medium of claim 44 wherein the query specification includes one or more sort variables for ordering of the results of the query.

51. The computer-readable medium of claim 44 wherein execution of the query produces the same query results for each application program.

52. A computer-readable medium containing instructions for controlling computer systems to execute queries by a method comprising:
   receiving a query definition that includes a query specification and a data source identifier, the query definition being encapsulated by a data structure that can be accessed by a plurality of different application programs; and
   requesting execution of the query definition to generate results.

53. The computer-readable medium of claim 52 wherein the query definition includes a results transform, the method further including using the results transform to transform the generated results from a raw format to a canonical format.

54. The computer-readable medium of claim 53 wherein the results transform is an XSL transform.

55. The computer-readable medium of claim 52 including transforming the generated results from a raw format to a canonical format.

56. The computer-readable medium of claim 52 wherein the query definition is a lens file.

57. The computer-readable medium of claim 52 wherein the query definition is stored in a single file.

58. The computer-readable medium of claim 52 wherein the results are in a canonical format.

59. The computer-readable medium of claim 52 wherein the requesting of execution of the query includes invoking a function of a first interface that returns a second interface for retrieving the results a portion at a time.

60. The computer-readable medium of claim 59 wherein the first API is the ILens interface.

61. The computer-readable medium of claim 59 wherein the second interface is the IChunks interface.

62. A computer system for executing queries, the computer system comprising:
   means for receiving a data structure encapsulating a query definition that includes a query specification and a data source identifier; and
   means for requesting execution of the query definition to generate results using the query specification and a data source identified by the data source identifier.

63. The computer system of claim 62 wherein the query definition includes a results transform and including using the results transform to transform the generated results from a raw format to a canonical format.

64. The computer system of claim 63 wherein the results transform is an XSL transform.

65. The computer system of claim 62 including transforming the generated results from a raw format to a canonical format.

66. The computer system of claim 62 wherein the query definition is a lens file.

67. The computer system of claim 62 wherein the query definition is stored in a single file.

68. The computer system of claim 62 wherein the results are in a canonical format.

* * * * *